United States Patent [19]

Takahashi

[11] Patent Number: 5,682,072
[45] Date of Patent: Oct. 28, 1997

[54] THREE-PHASE BRUSHLESS MOTOR

[75] Inventor: Minoru Takahashi, Tokyo, Japan

[73] Assignee: NSK Ltd., Tokyo, Japan

[21] Appl. No.: 374,871

[22] Filed: Jan. 19, 1995

[30] Foreign Application Priority Data

| Jan. 20, 1994 | [JP] | Japan | 6-004339 |
| May 18, 1994 | [JP] | Japan | 6-103958 |
| Sep. 22, 1994 | [JP] | Japan | 6-228128 |

[51] Int. Cl.$^6$ ............................. H02K 21/12
[52] U.S. Cl. ............................. 310/156
[58] Field of Search ............ 310/156, 67 R, 310/261, 152, 179, 216, 218, 254

[56] References Cited

U.S. PATENT DOCUMENTS

| 2,338,525 | 1/1944 | Mason | 310/156 |
| 4,127,786 | 11/1978 | Volkrodt | 310/156 |
| 4,302,693 | 11/1981 | Burgmeier et al. | 310/156 |
| 4,403,161 | 9/1983 | Miyashita et al. | 310/156 |
| 4,417,167 | 11/1983 | Ishii et al. | 310/67 R |
| 4,486,678 | 12/1984 | Olson | 310/156 |
| 4,583,015 | 4/1986 | Toshimitsu | 310/187 |
| 4,658,165 | 4/1987 | Vanderschaeghe | 310/156 |
| 4,672,253 | 6/1987 | Tajima et al. | 310/156 |
| 4,893,040 | 1/1990 | Turner et al. | 310/156 |
| 4,918,346 | 4/1990 | Tajima et al. | 310/156 |
| 4,950,960 | 8/1990 | Krefta et al. | 318/254 |
| 4,987,329 | 1/1991 | Schmidt et al. | 310/156 |
| 5,030,868 | 7/1991 | Suzuki et al. | 310/156 |
| 5,047,680 | 9/1991 | Torok | 310/156 |
| 5,093,595 | 3/1992 | Korbel | 310/156 |
| 5,101,131 | 3/1992 | Ushiro et al. | 310/258 |
| 5,233,250 | 8/1993 | De Fillippis | 310/156 |
| 5,250,867 | 10/1993 | Gizaw | 310/179 |

FOREIGN PATENT DOCUMENTS

| A10502831 | 9/1992 | European Pat. Off. | H02K 29/00 |
| 2548843 | 1/1985 | France | H02K 1/27 |

OTHER PUBLICATIONS

Patent Abstracts of Japan, Unexamined Applications, E field, vol. 17, No. 960, Aug. 23, 1993, The Patent Office Japanese Government, p. 87 E 1419; JP-A-05 103 453 (Toshiba).

Primary Examiner—Steven L. Stephan
Assistant Examiner—Michael J. Wallace, Jr.
Attorney, Agent, or Firm—Sughrue, Mion, Zinn, Macpeak & Seas, PLLC

[57] ABSTRACT

A three-phase brushless motor includes a rotary shaft, a rotor fixed to an outer surface of the rotary shaft, and a drive coil of three phases disposed around the rotor. An outer surface of the rotor is magnetized to have alternately and equidistantly arrayed S and N poles and a plural number of low flux density regions are provided in a gap between the outer surface of the rotor and an inner surface of the drive coil.

14 Claims, 16 Drawing Sheets

THREE-PHASE BRUSHLESS MOTOR

BACKGROUND OF THE INVENTION

The present invention relates to a three-phase brushless motor, and more particularly to a three-phase brushless motor used as a drive source for a motor-driven power steering apparatus.

A power steering apparatus is widely used for reducing a steering force in a motor vehicle. It is known to use a three-phase brushless motor as a drive source for the power steering apparatus in a small motor vehicle. FIG. 1 shows the structure of a general three-phase brushless motor. In a motor case 1, the opening of the front end (upper end in FIG. 1) of a cylindrical shell 2 is closed by a disc-like front cover 3. The opening of the rear end (the lower end in FIG. 1) thereof is closed by a disc-like rear cover 4. Bearings 5 are located at the central parts of the front cover 3 and the rear cover 4. A rotary shaft 6, extending axially through the cylindrical shell 2, is rotatably supported by the bearings 5.

A rotor 7 is fastened to the outer surface of the central portion of the rotary shaft 6, within the motor case 1. The rotor 7 is made of a perment magnet and as shown in FIG. 3, different magnetic poles (S and N poles) are alternately and equidistantly arrayed on the outer surface 7a of the rotor 7. In the rotor 7, the alternate array of different magnetic poles on the outer surface thereof is realized by cylindrically combining permanent magnets of the same size and same shape, e.g., a circular arc, or by magnetizing a single cylindrical permanent magnet so as to have such an array of magnetic poles.

A drive coil 8 of three phases is fastened to the inner surface of the cylindrical shell 2. The drive coil 8 is cylindrically shaped by coil elements 10a, 10b, and 10c (to be described later) around a core 9 made of magnetic material. The cylindrical drive coil 8 is disposed such that the inner surface thereof faces the outer surface of the rotor 7. In the drive coil 8, the coil elements 10a, 10b, and 10c of three phases, phase a, phase b, and phase c, are combined as shown in FIG. 2. In accordance with output signals of Hall elements 12, a control circuit as shown in FIG. 2 controls the currents fed to the coil elements 10a, 10b, and 10c.

A permanent magnet 11 for phase sensing is firmly attached to the rear end (the lower end in FIG. 1) of the rotary shaft 6 in a state that it faces the inner surface 4a of the rear cover 4. In the permanent magnet 11 shaped like a disc, different magnetic poles are alternately and equidistantly arrayed in the circumferential direction, as in the rotor 7. The phase sensing Hall elements 12 are provided in opposition to the side face of the permanent magnet 11. In the example illustrated, three phase sensing elements 12 are mounted on a disc-like support plate 13 made of nonmagnetic material. The support plate 13 is supported through stays 14 on the inner surface 4a of the rear cover 4.

For the phase detection of the rotor 7 and the drive coil 8, the phase sensing elements 12 sense the direction of the magnetic flux in a magnetic circuit formed by the permanent magnet 11. The pitch of the change of the magnetic poles in the permanent magnet 11 is equal to that of the change of the magnetic poles on the outer surface 7a of the rotor 7. Therefore, the rotor 7 can be turned in a desired direction in a manner that the phases of the rotor 7 and the drive coil 8 are sensed by the phase sensing elements 12, and on the basis of the sensed phases, DC currents of proper direction are fed at proper timings to two coils of those coil elements 10a, 10b, and 10c, constituting the drive coil 8, of three phases, phase a, phase b, and phase c.

That is, to turn the rotary shaft 6, DC currents of proper direction are fed to two coils of the coil elements 10a, 10b, and 10c of the drive coil 8, to thereby excite the drive coil 8, under control by a control circuit including transistors 15 or SCRs (silicon controlled rectifiers) constructed as shown in FIG. 3. The control is based on the phases of the rotor 7 and the drive coil 8 that are sensed by the phase sensing elements 12. To be more specific, rectangular wave currents of the opposite directions are fed to two coils of the coil elements 10a, 10b, and 10c of the drive coil 8, while no current is fed to the remaining one. This state of current feeding is repeated while changing (switching) every 60° of electrical angle. With this, the magnetic attraction and repulsion act between the rotor 7 and the drive coil 8 to turn the rotor 7.

In the application of the three-phase brushless motor thus constructed to a drive source of a power steering apparatus, a rotation drive force is derived out of the front end (the upper end in FIG. 1), and transmitted to the steering shaft. The rotation drive force (torque) T is set to be smaller than a force (torque) F required for turning the steering shaft (T<F). The rotation drive force is utilized for reducing the force necessary for the operation of the steering wheel. To keep the steered wheels (generally the front wheels of a motor vehicle) at a steering angle, a force to keep the steered wheels at the steering angle is applied from the rotary shaft 6 to the steering shaft. As a result, the steering force that must continuously be applied to the steering wheel for keeping the steered wheels at that angle may be reduced.

In the three-phase brushless motor thus constructed, variation of the motor torque with the turn of the motor is great. Because of this, the motor is not suitable for the drive source of the power steering of a motor vehicle.

A magnetic flux density sinusoidally varies as shown in FIG. 4, on the outer surface 7a of the rotor 7 made of permanent magnet. A torque to turn the rotor 7, which is caused by the currents and acts between the coil elements 10a, 10b, and 10c and the rotor 7, is proportional to the magnetic flux density. When a torque acting on the rotor 7 by the coil element 10a of the phase a varies as indicated by a solid line a in FIG. 5, a torque acting on the rotor by the coil element 10b of the phase b varies as indicated by a one-dot chain line b, and a torque acting on the rotor by the coil element 10c of the phase c varies as indicated by a dotted line c. A torque acting on the rotary shaft 6 from the rotor 7 is the sum of those torques developed by the coil elements 10a, 10b, and 10c. The torque T varies tracing a curve A indicated by a solid line in FIG. 5, with rotation of the rotary shaft 6.

As seen from the curve A, the torque T of the rotary shaft 6 varies at a period of 60° in electrical angle (when three S poles and three N poles are used as shown in FIG. 3, the torque T varies at a period of 1/18 turn of the rotary shaft 6). The height or amplitude ΔT (torque ripple) of the torque variation (referred to as a variation width of the torque) is considerably large. The calculation by the inventor of the present Patent Application shows that a ratio of the variation width $\Delta T$ $(=T_{MAX}-T_{MIN})$ to an average value of the torque $T_{AVE}$ $(=(T_{MAX}+T_{MIN})/2)$ is 14.2%. Here, $T_{MAX}$ indicates the maximum value of the torque T, and $T_{MIN}$, the minimum value thereof.

In a case where the three-phase brushless motor of this type in which the torque T of the rotary shaft 6 greatly varies is used for the drive source of the power steering apparatus, the force (steering force) to operate the steering wheel by a driver greatly varies with the variation of the assist force (torque). This is not preferable since an unnatural steering feeling is given to a driver.

The variation of the torque T, which brings about the unnatural steering feeling, arises from the sinusoidal wave variation of the flux density on the outer surface of the rotor 7. Accordingly, the variation of the torque T can be minimized by magnetizing the permanent magnet of the rotor 7 properly. One of the ways to minimize the torque variation is to shape the flux density distribution curve into a trapezoidal wave curve as shown in FIG. 6. However, it is technically difficult to shape the flux density distribution curve into the trapezoidal waveform curve. Thus, this approach is impractical.

SUMMARY OF THE INVENTION

In view of the above, the present invention has been made. An object of the present invention is therefore to provide a three-phase brushless motor in which the variation of the torque can be minimized.

According to a first aspect of the present invention, a three-phase brushless motor includes a rotary shaft, a rotor fastened to the outer surface of the rotary shaft, and drive coils of three phases disposed enclosing the rotor, N and S poles being alternately and equidistantly arrayed on the outer surface of the rotor, in which a plurality of low flux density regions are provided in the gap between the outer surface of the rotor and the inner surface of the drive coils. The low flux density regions are each located at the position circumferentially spaced approximately 60° in electrical angle from the boundary between the adjacent N and S poles on the outer surface of the rotor in the circumferential direction.

In the three-phase brushless motor according to the first aspect of the present invention, the magnetic flux density in the gap between the outer surface of the rotor and the inner surface of the drive coils is low at the low flux density regions. Accordingly, the torque of the rotary shaft is reduced by a quantity corresponding to the reduced quantity of the magnetic flux density. The portions where the flux density is reduced and hence the torque of the rotary shaft is reduced, correspond to the portions where the peak torque appears. Accordingly, the difference between the maximum and minimum values of the torque, viz., the variation width of the torque, is reduced by a quantity corresponding to the reduced quantity of the maximum value of the torque.

According to a second aspect of the present invention, a three-phase brushless motor includes a rotary shaft, a rotor fastened to the outer surface of the rotary shaft, and drive coils of three phases disposed enclosing the rotor, N and S poles being alternately and equidistantly arrayed on the outer surface of the rotor, in which the rotor is cylindrical in shape, the outer surface of the rotor is smooth having no irregularity, and a plurality of holes are axially formed in the rotor. The holes are each located at the position circumferentially spaced approximately 60° in electrical angle from the boundary between the adjacent N and S poles in the circumferential direction.

In the three-phase brushless motor according to the second aspect of the present invention, the magnetic flux density is low at the portions of the holes formed therein. Accordingly, the torque of the rotary shaft is reduced by a quantity corresponding to the reduced quantity of the magnetic flux density. The portions where the flux density is reduced and hence the torque of the rotary shaft is reduced, correspond to the portions where the peak torque appears. Accordingly, the difference between the maximum and minimum values of the torque, viz., the variation width of the torque, is reduced by a quantity corresponding to the reduced quantity of the maximum value of the torque.

According to a third aspect of the present invention, a three-phase brushless motor includes a rotary shaft, a rotor fastened to the outer surface of the rotary shaft, and drive coils of three phases disposed enclosing the rotor, N and S poles being alternately and equidistantly arrayed on the outer surface of the rotor, in which a plurality of segments each shaped like a circular arc in cross section are arranged on the same circumference, thereby forming a cylindrical rotor. A plurality of grooves are formed at the boundary between the adjacent segments. Each groove extends in the axial direction of each rotor. Further, the groove is located at the position circumferentially spaced 60° in electrical angle from the boundary between the adjacent N and S poles on the outer surface of the rotor in the circumferential direction.

In the three-phase brushless motor according to the third aspect of the present invention, the width of the gap between the outer surface of the rotor and the inner surface of the drive coils is wide at the portions corresponding to the grooves located between the adjacent segments. With this structure, the magnetic flux density is low at the grooves. Accordingly, the torque of the rotary shaft is reduced by a quantity corresponding to the reduced quantity of the magnetic flux density. The portions where the flux density is reduced and hence the torque of the rotary shaft is reduced, correspond to the portions where the peak torque appears. Accordingly, the difference between the maximum and minimum values of the torque, viz., the variation width of the torque, is reduced by a quantity corresponding to the reduced quantity of the maximum value of the torque.

According to a fourth aspect of the present invention, a three-phase brushless motor includes a rotary shaft, a rotor fastened to the outer surface of the rotary shaft, and drive coils of three phases disposed enclosing the rotor, N and S poles being alternately and equidistantly arrayed on the outer surface of the rotor, in which the drive coils are delta-connected and low flux density portions or the flux absent regions are present at the position circumferentially spaced approximately 90° in electrical angle apart from the boundary between the N and S poles on the outer surface of the rotor in the circumferential direction.

In the construction of the three-phase brushless motor according to the fourth aspect of the present invention, the torque of the rotary shaft is reduced by a quantity corresponding to the reduced quantity of the magnetic flux density at the low flux density region or the magnetic flux absent region. The portions where the flux density is reduced and hence the torque of the rotary shaft is reduced, correspond to the portions where the peak torque appears. Accordingly, the difference between the maximum and minimum values of the torque, viz., the variation width of the torque, is reduced by a quantity corresponding to the reduced quantity of the maximum value of the torque.

According to a fifth aspect of the present invention, a three-phase brushless motor includes a rotor, rotatably mounted, of which the circumferential outer surface are magnetized to have alternately and equidistantly arrayed N and S poles, a star-connected three-phase exciting coil disposed enclosing the outer surface of the rotor, and a drive circuit for supplying exciting currents to the three-phase exciting coil, wherein the drive circuit is a three-phase excite drive circuit for constantly supplying exciting currents of some values to all of three-phase exciting coils, and a low magnetic flux density region is formed at the central part of each of the magnetic poles of the rotor.

In the three-phase brushless motor according to the fifth aspect of the present invention, the drive circuit is the three-phase exciting drive circuit. Accordingly, exciting currents of some values are constantly supplied to all of the exciting coils of three phases. In this point, the three-phase brushless motor is different from the two-phase brushless motor. Accordingly, the three-phase brushless motor keeps its output torque when the phase of one exciting coil is switched since the exciting current flows through the remaining exciting coils at that time. Thus, the phase switching is smoothly performed.

In the three-phase exciting drive system, a position where the torque of the motor as the sum of the torques of the exciting coils is maximized, is at a position where the coil faces a center position (as circumferentially seen) of the region of the rotor which is magnetized to have an S or N pole (the center position corresponds to a position apart 90° in electrical angle from the boundary between the S and N poles, and referred to as a circumferential center position.). A low flux density region is formed at this circumferential center position. Because of this, the maximum value of the motor torque is correspondingly reduced, and hence the torque ripple is also reduced.

The method of forming the low flux density region may be formed in various ways. It may be formed by using a magnetizing method so designed. It may also be formed by forming grooves or gaps at the circumferential central positions of the permanent magnet.

DETAILED DESCRIPTION OF THE PREFERRED EMBODIMENTS

FIGS. 7 through 11 show a first embodiment of the present invention. The first embodiment is characterized in that to reduce a variation of the torque of the rotary shaft, a rotor 107 is uniquely structured, to thereby adjust a magnetic flux density in the gap between the outer surface of the rotor 107 and the inner surface of the drive coil 8. The construction and operation of the remaining portions are substantially the same as those of the conventional three-phase brushless motor. Thus, the description of the portions similar to those of the conventional three-phase brushless motor will be omitted.

Figure 1:
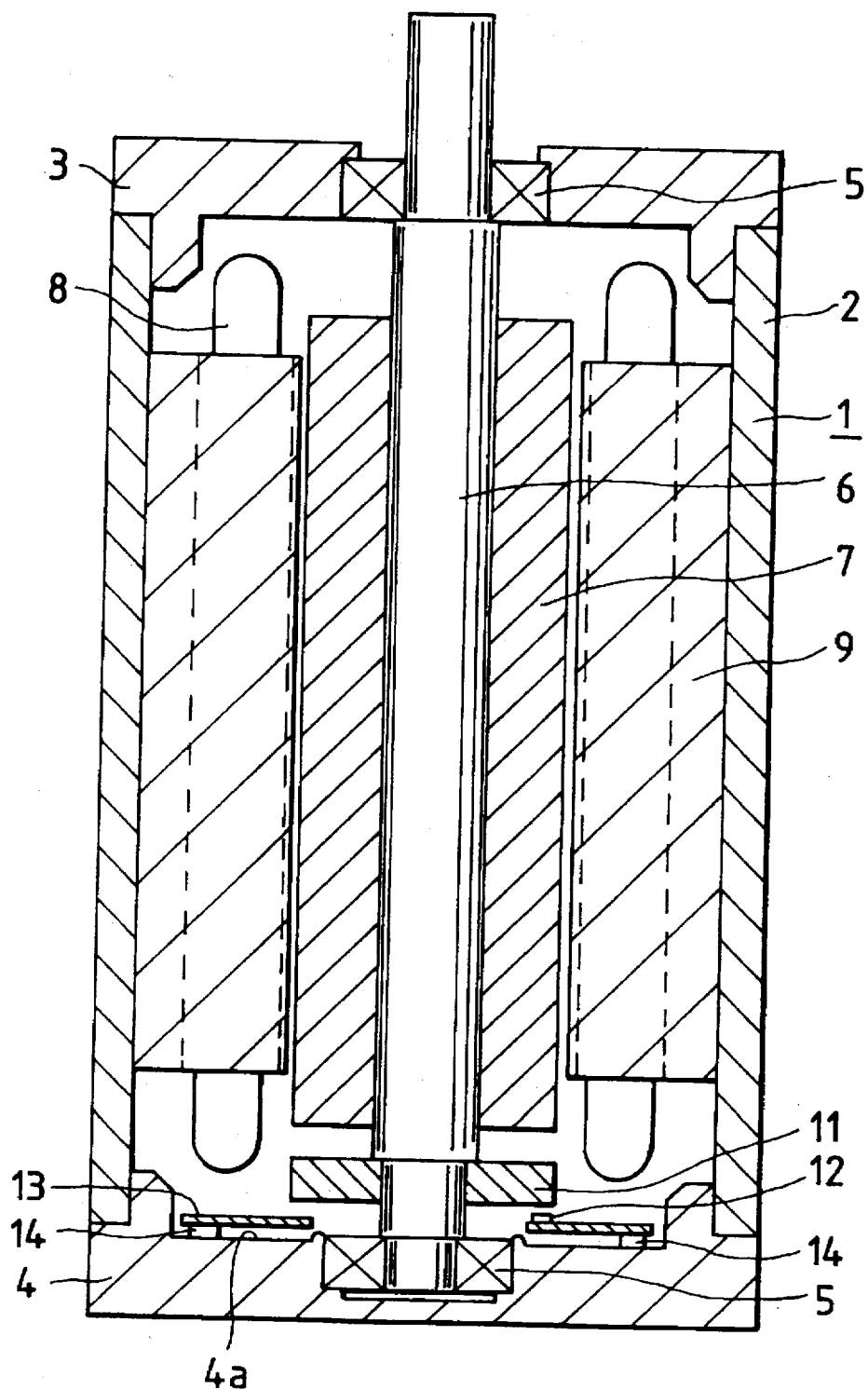
FIG. 1 is a cross sectional view showing the structure of a conventional three-phase brushless motor.

In the first embodiment, N and S poles are alternately and equidistantly arrayed on the outer surface 107a of the rotor 107. The rotor 107 is fastened to the central portion of the outer surface of the rotary shaft 6 (see FIG. 1) and turns together with the rotary shaft 6. A plural number of grooves 116 are formed at the central position of each of the magnetic poles (as viewed in the circumferential direction) on the outer surface 107a of the rotor 107. The grooves 116 extend in the axial direction of the rotor 107. The gap between the outer surface 107a and the inner surface of the drive coil 8 is wider at the grooves 116 than at the remaining portions. These wider gap portions are low flux density regions.

Figure 8A:
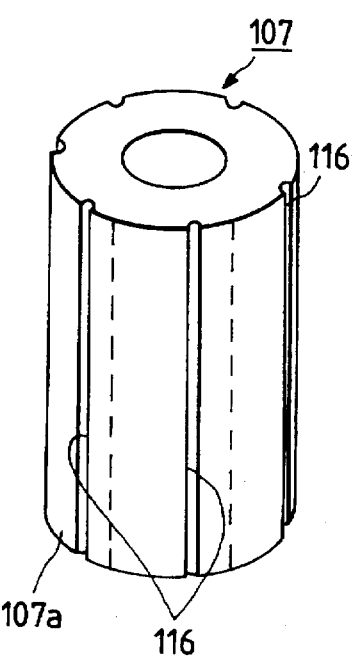
FIGS. 8(A) to 8(C) are perspective views showing the rotors with three types of grooves formed thereon, available for the three-phase brushless motor of the first embodiment.
Figure 8B:
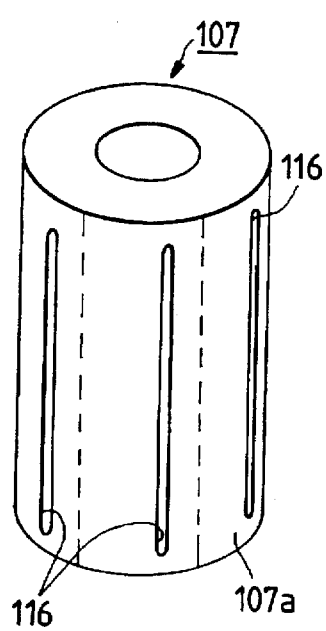
Figure 8C:
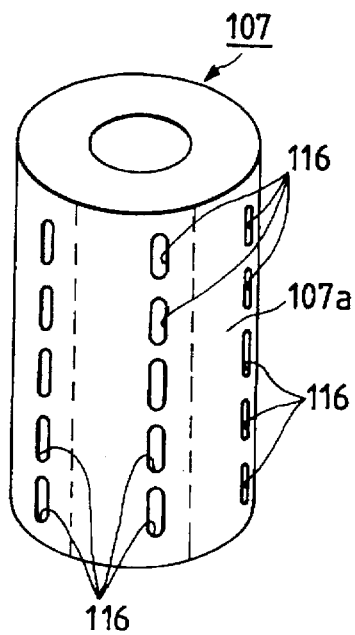

The grooves 116 are each located at the position circumferentially spaced approximately 60° in electrical angle from the boundary between the adjacent N and S poles on the outer surface 107a of the rotor 107. The grooves 116 may take any of the forms shown in FIG. 8(A), 8(B), and 8(C). The grooves 116 of FIG. 8(A) continuously extend over the entire length of the rotor 107. The continuous grooves 116 of FIG. 8(B) each terminate at positions close to both ends of the rotor. The grooves 116 of FIG. 8(C) are not continuous. In other words, a plural number of linear arrays each consisting of a plural number of elongated holes 116 are formed on the outer surface 107a of the rotor 107 in the axial direction thereof.

Figure 9:
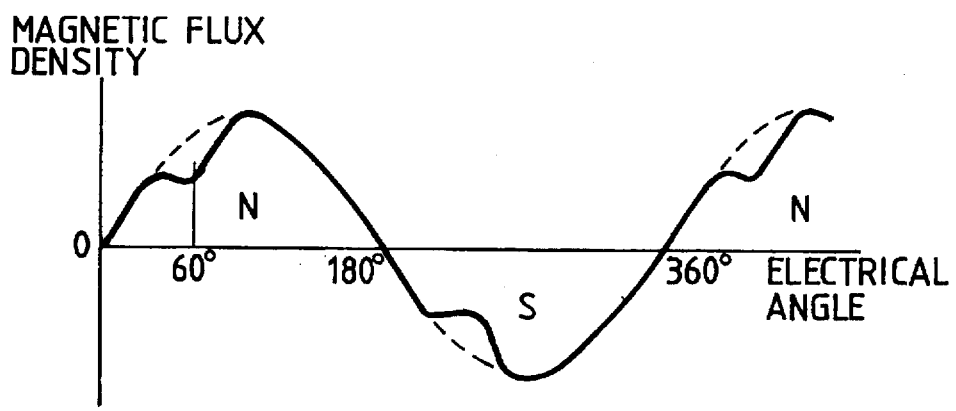
FIG. 9 is a graph showing a variation of a magnetic flux density distribution in the outer surface of the rotor shown in FIG. 7.
Figure 10:
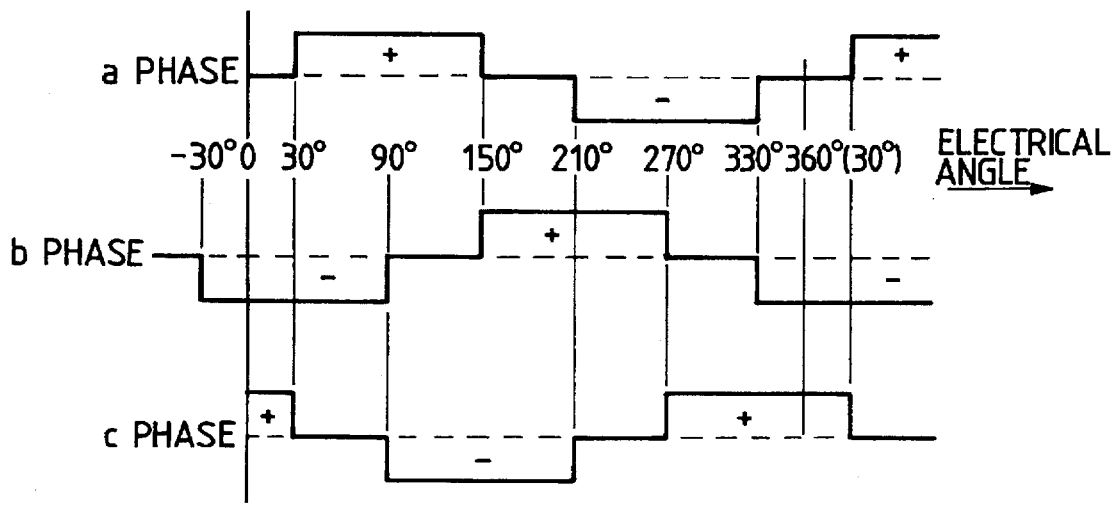
FIG. 10 is a graph showing a state of feeding currents to the drive coils.
Figure 11:
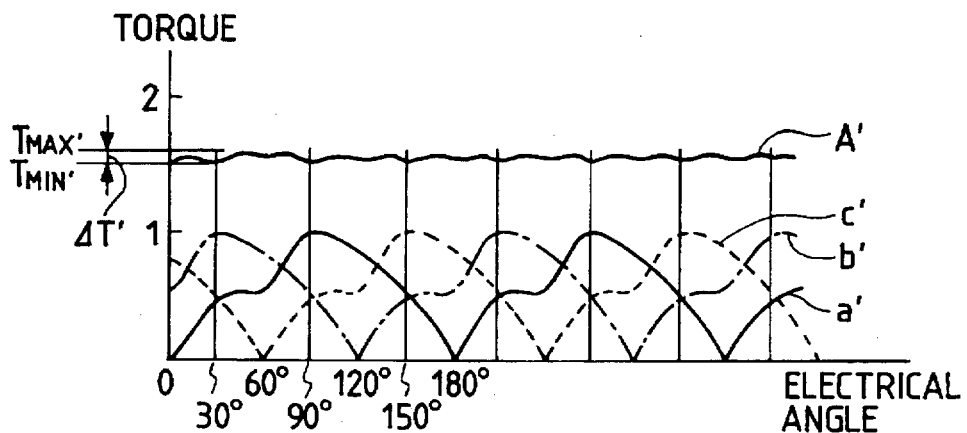
FIG. 11 is a graph showing variations of the torques developed by the three-phase brushless motor of the first embodiment.

In the three-phase brushless motor thus constructed, a magnetic flux density is distributed as shown in FIG. 9, in the gap between the outer surface 107a of the rotor 107 and the inner surface of the drive coil 8. As seen, the flux density drops at the position spaced 60° in electrical angle apart from the boundary between the adjacent different magnetic poles. The low flux density region by the grooves 116 exists at this position. The drive coil 8, disposed facing the outer surface 107a of the rotor 107, includes coil elements 10a, 10b, and 10c of three phases (see FIG. 2), as of the conventional motor. Rectangular wave currents having phases shifted one another as shown in FIG. 10 are fed to those coil elements 10a, 10b, and 10c.

When the currents are fed to the coil elements 10a, 10b, and 10c, the torque T for turning the rotor 107 is proportional to the flux density on the outer surface 107a of the rotor 107, as in the conventional structure. When the torque acting on the rotor 107 by the coil element 10a of phase a varies as indicated by a solid line a' in FIG. 11, the torque of the rotor 107 caused by the coil element 10b of phase b varies as indicated by a chain line b', and the torque of the rotor 107 caused by the coil element 10c of phase c varies as indicated by a broken line b'. A torque of the rotary shaft 6 transmitted from the rotor 107 is the sum of these torques caused individually by these coil elements 10a, 10b, and 10c. The torque of the rotary shaft 6 varies as indicated by a solid line A' in FIG. 11, with rotation of the rotary shaft 6.

The torque T of the rotary shaft 6 represented by the solid line A' is reduced by a quantity corresponding to the reduced quantity of the flux density on the outer surface 107a of the rotor 107. The portions where the flux density is reduced and hence the torque of the rotary shaft 6 is reduced, correspond to the portions where the value of torque T is peaked. Accordingly, the difference between the maximum value $T_{MAX}40$ and the minimum value $T_{MIN}'$ of the torque, viz., a variation width $\Delta T'$ of the torque T, is reduced by a quantity corresponding to the reduced quantity of the maximum value $T_{MIN}'$ of the torque T.

When a flux density at the position spaced 60° apart from the boundary between the adjacent different magnetic poles of the rotor having grooves 116 is 70% of that of the rotor having no grooves, a ratio of $\Delta T'$ ($=T_{MAX}'-T_{MIN}'$) to an average value $T_{AVE}'$ ($=(T_{MAX}'+T_{MIN}')/2$) of the torque T is reduced to approximately 1%. This was confirmed by calculation by the inventor.

Low magnetic flux density regions or magnetic flux absent regions, in place of the grooves 116, may be formed at the position spaced 60° apart from the boundary between the adjacent different magnetic poles of the motor.

As seen from the foregoing description, since the three-phase brushless motor of the first embodiment is thus constructed, a variation of the torque of the rotary shaft is minimized. When the three-phase brushless motor of the first embodiment is applied to the drive source of the power steering apparatus, a driver can turn the steering wheel without any unnatural feeling.

FIGS. 12 through 15 show a second embodiment of the present invention. The second embodiment is characterized in that to reduce a variation of the torque of the rotary shaft, a rotor 207 is uniquely structured, to thereby adjust a magnetic flux density in the gap between the outer surface of the rotor 207 and the inner surface of the drive coil 8. The construction and operation of the remaining portions are substantially the same as those of the conventional three-phase brushless motor. Thus, the description of the portions similar to those of the conventional three-phase brushless motor will be omitted.

Figure 12:
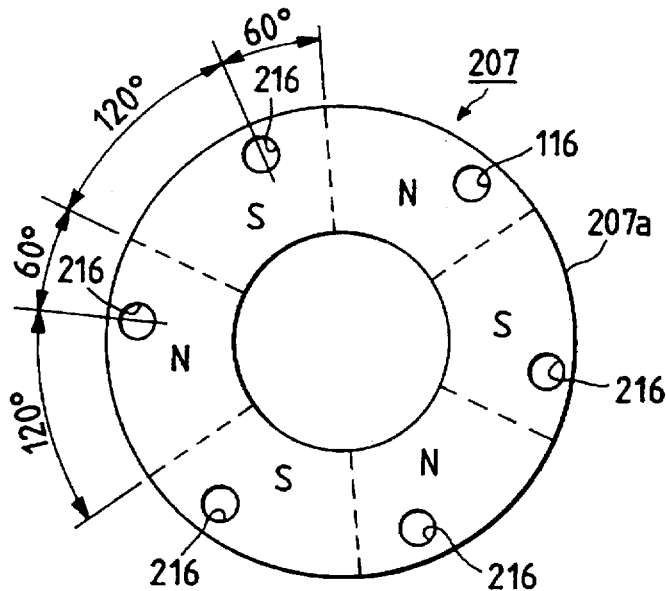
FIG. 12 is a view showing the end face of a rotor assembled into a three-phase brushless motor according to a second embodiment of the present invention.

In the second embodiment, N and S poles are alternately and equidistantly arrayed on the outer surface 207a of the rotor 207. A rotor 207 is fastened to the central portion of the outer surface of the rotary shaft 6 (see FIG. 1) and turns together with the rotary shaft 6. An outer surface 207a of the rotor 207 is smooth. As shown in FIG. 12, a plural number of circular holes 216 are formed at a portion of each magnetic pole which is located inside the outer surface thereof in the diameter direction and on the center line of the magnet pole in the circumferential direction. The circular holes 216 extend along the axial direction of the rotor 207 and define are void space.

In more detail, the holes 216 are formed in the S and N poles and each is located at the position circumferentially spaced approximately 60° in electrical angle from the boundary between the adjacent N and S poles.

Figure 13:
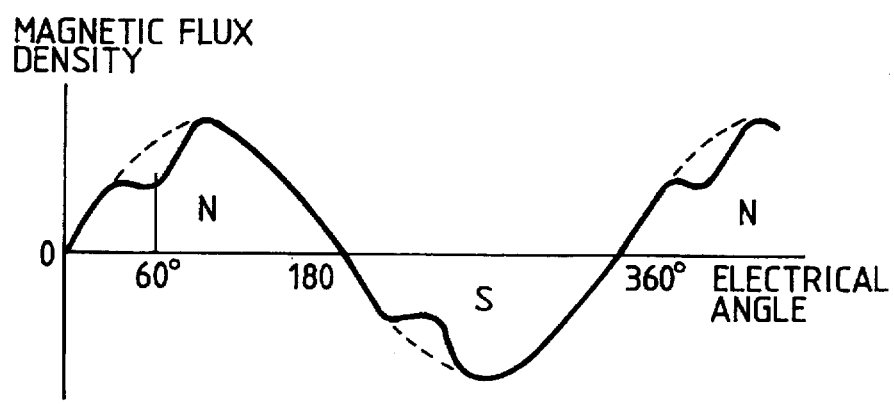
FIG. 13 is a graph showing a variation of a magnetic flux density distribution in the outer surface of the rotor shown in FIG. 12.
Figure 14:
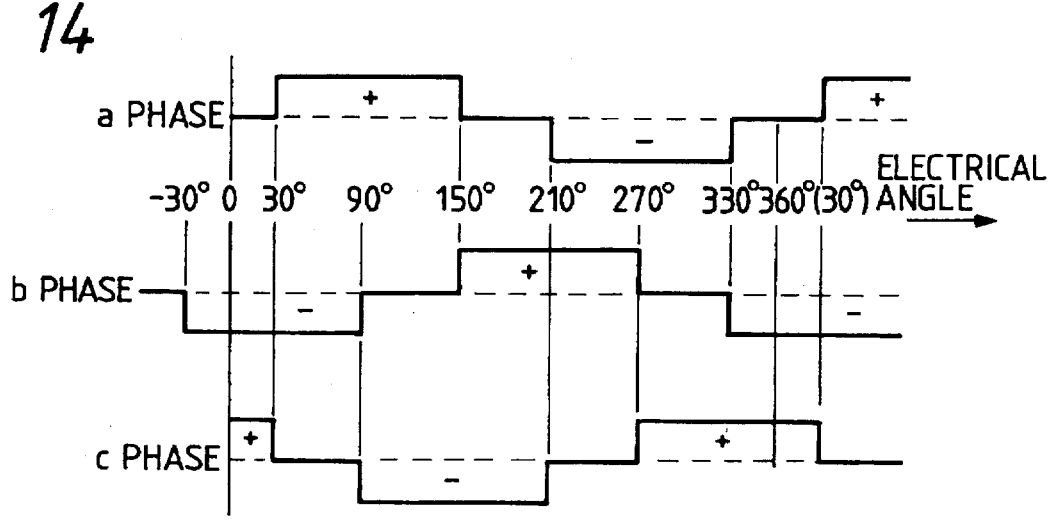
FIG. 14 is a graph showing a state of feeding currents to the drive coils.
Figure 15:
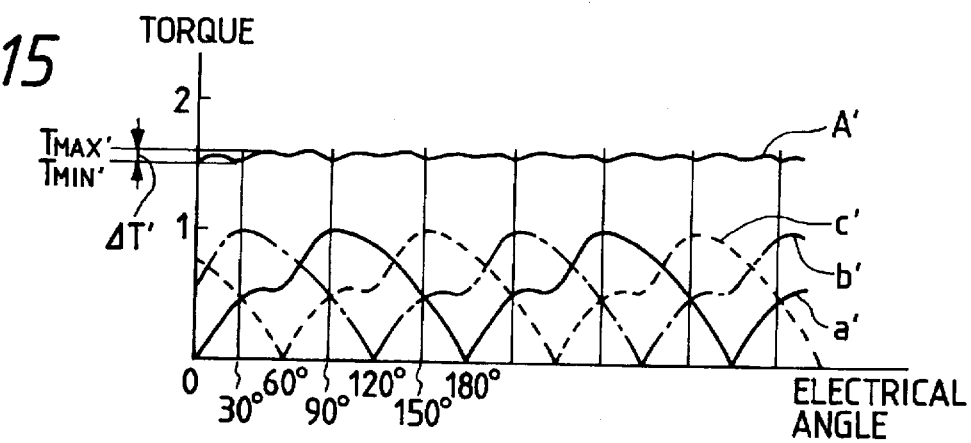
FIG. 15 is a graph showing variations of the torques developed by the three-phase brushless motor of the second embodiment.

In the three-phase brushless motor thus constructed, a magnetic flux density is distributed as shown in FIG. 13. As seen, the flux density on the outer surface 207a of the rotor 207 drops at the position spaced approximately 60° in electrical angle apart from the boundary between the adjacent different magnetic poles. The holes 216 are each formed at this position. The drive coil 8, disposed facing the outer surface 207a of the rotor 207, includes coil elements 10a, 10b, and 10c of three phases (see FIG. 2), as of the conventional motor. Rectangular wave currents having phases shifted one another as shown in FIG. 14 are fed to those coil elements 10a, 10b, and 10c.

When the currents are fed to the coil elements 10a, 10b, and 10c, the torque T for turning the rotor 207 is proportional to the flux density on the outer surface 207a of the rotor 207, as in the conventional structure. When the torque acting on the rotor 207 by the coil element 10a of phase a varies as indicated by a solid line a' in FIG. 15, the torque of the rotor 207 caused by the coil element 10b of phase b varies as indicated by a chain line b', and the torque of the rotor 207 caused by the coil element 10c of phase c varies as indicated by a broken line c'. A torque of the rotary shaft 6 transmitted from the rotor 207 is the sum of these torques caused individually by these coil elements 10a, 10b, and 10c. The torque of the rotary shaft 6 varies as indicated by a solid line A' in FIG. 15, with rotation of the rotary shaft 6.

The torque T of the rotary shaft 6 represented by the solid line A' is reduced by a quantity corresponding to the reduced quantity of the flux density on the outer surface 207a of the rotor 207. The portions where the flux density is reduced and hence the torque of the rotary shaft 6 is reduced, correspond to the portions where the value of torque T is peaked. Accordingly, the difference between the maximum value $T_{MAX}'$ and the minimum value $T_{MIN}'$ of the torque, viz., a variation width $\Delta T'$ of the torque T, is reduced by a quantity corresponding to the reduced quantity of the maximum value $T_{MIN}'$ of the torque T.

When a flux density at the position spaced approximately 60° apart from the boundary between the adjacent different magnetic poles of the rotor having the holes 216 is 70% of that of the rotor having no holes, a ratio of $\Delta T'$ (=$T_{MAX}'$ − $T_{MIN}'$) to an average value $T_{AVE}'$ (=($T_{MAX}'$+$T_{MIN}'$)/2) of the torque T is reduced to approximately 1%. This was confirmed by calculation by the inventor.

Figure 16:
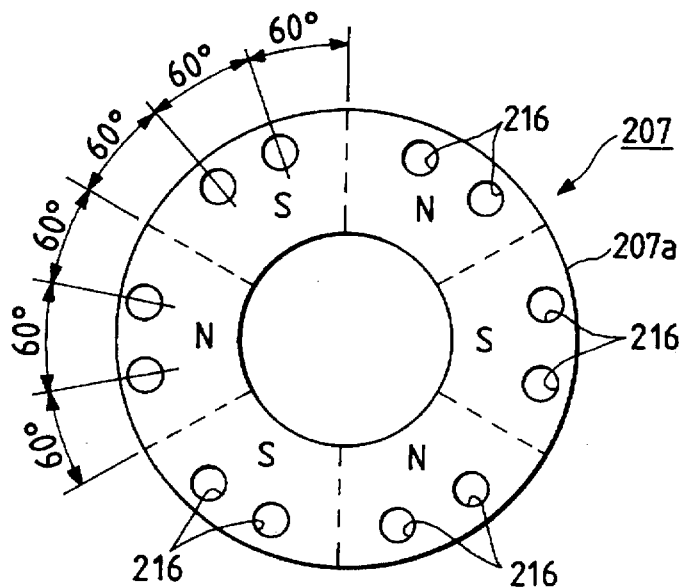
FIG. 16 is a view showing the end face of a rotor assembled into a three-phase brushless motor according to a third embodiment of the present invention.
Figure 17:
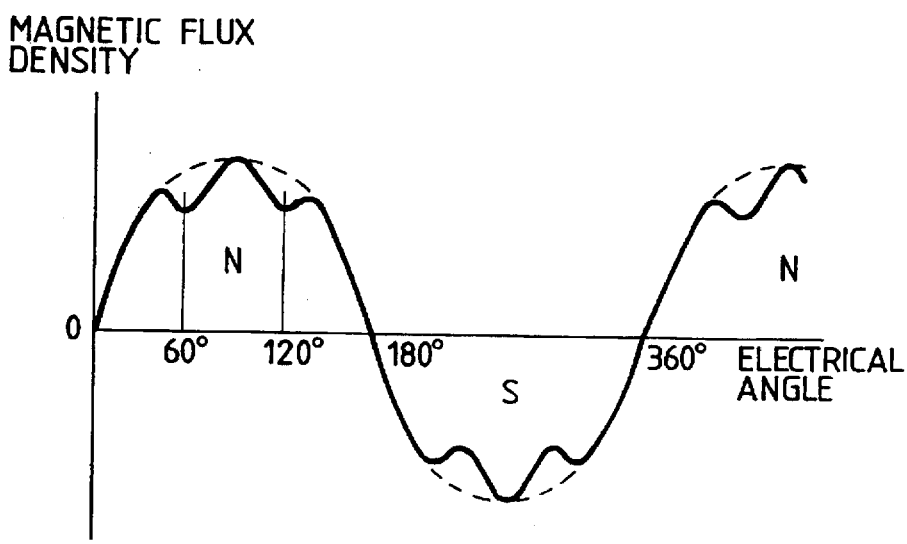
FIG. 17 is a graph showing a variation of a magnetic flux density distribution in the outer surface of the rotor shown in FIG. 16.
Figure 18:
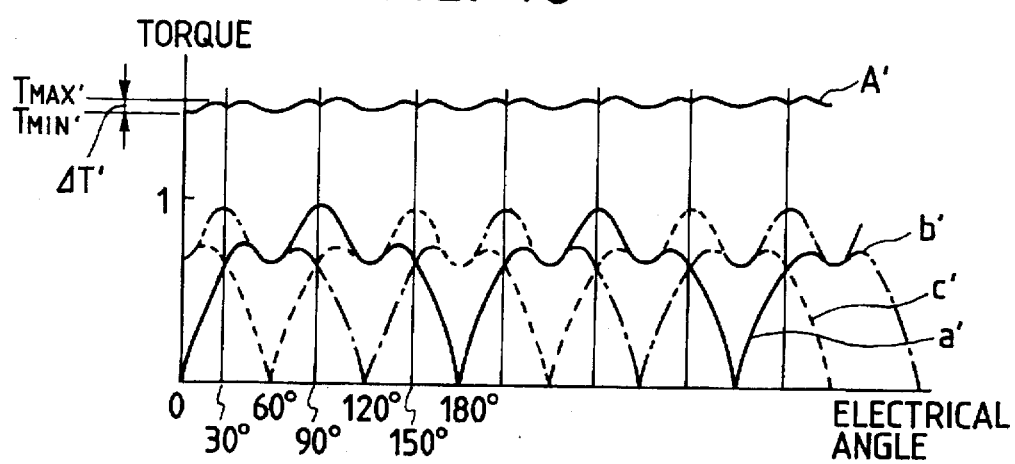
FIG. 18 is a graph showing variations of the torques developed by the three-phase brushless motor of the third embodiment.

FIGS. 16 through 18 show a third embodiment of the present invention. As already described, in the second embodiment, one circular hole 216 that is formed in each magnetic pole is located at the position circumferentially spaced approximately 60° in electrical angle apart from the boundary between the adjacent different magnetic poles. In the third embodiment, a pair of holes 216 are formed at the positions circumferentially spaced approximately 60° and 120° apart from the boundary between the N and S poles. Accordingly, the magnetic flux density drops at two locations circumferentially spaced approximately 60° and 120° in electrical angle apart from the boundary between the N and S poles, as shown in FIG. 17.

As in the second embodiment, the torques of the rotor 207 caused by the coil elements 10a, 10b, and 10c vary as indicated by a solid line a', a chain line b', and a broken line c' in FIG. 18. The variation width of the torque of the rotary shaft 6 is very small as indicated by a solid line A' in FIG. 18.

As seen from the foregoing description, since the three-phase brushless motor of the second or third embodiment is thus constructed, a variation of the torque of the rotary shaft is minimized. When the three-phase brushless motor of the embodiment is applied to the drive source of the power steering apparatus, a driver can turn the steering wheel without any unnatural feeling. Further, since the outer surface of the rotor is smooth, there is less chance that foreign materials are put into the gap between the outer surface of the rotor and the inner surface of the drive coil.

FIGS. 19 through 22 show a fourth embodiment of the present invention. The fourth embodiment is characterized in that, to reduce a variation of the torque of the rotary shaft, a rotor 307A is uniquely structured, to thereby adjust a magnetic flux density in the gap between the outer surface 307a of the rotor 307A and the inner surface of the drive coil 8 (see FIG. 1). The construction and operation of the remaining portions are substantially the same as those of the conventional three-phase brushless motor. Thus, the description of the portions similar to those of the conventional three-phase brushless motor will be omitted. The angle used in the drawings is an electrical angle.

Figure 19:
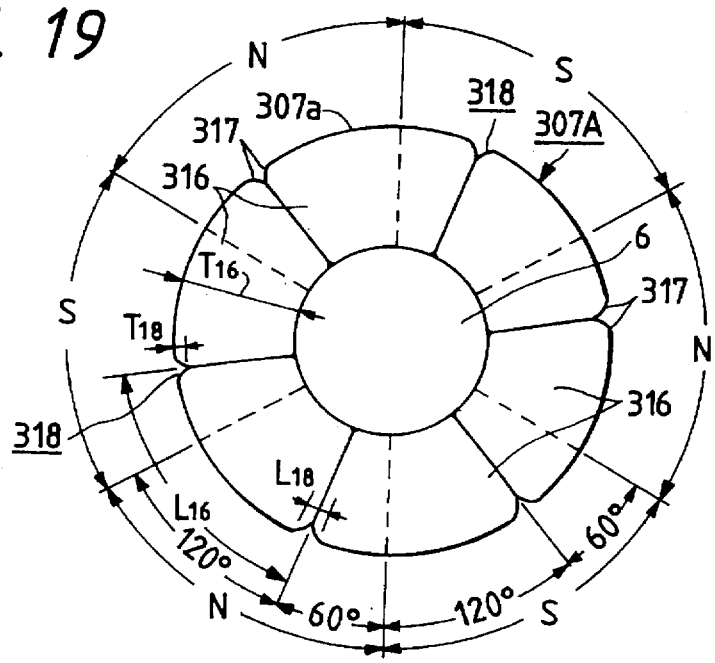
FIG. 19 is a view showing the end face of a rotor assembled into a three-phase brushless motor according to a fourth embodiment of the present invention.

As shown in FIG. 19, a rotor 307A is fastened to the central portion of the outer surface of a rotary shaft 6 and turns together with the rotary shaft 6. In the fourth embodiment, a plural number of segmental permanent magnets 316 (referred to as segments) each shaped like a circular arc in cross section are arranged on the same circumference, to thereby form the cylindrical rotor 307A. In the embodiment shown in FIG. 19, six segments 316 of the same shape and equal dimensions are combined into the cylindrical rotor 307A. The mechanical center angle of each of the segments 316 is 60°.

The corners of the outer surface of each of the segments 316 are beveled. These beveled corners are designated by reference numeral 317. The rotor 307A formed by combining the segments 316 with the beveled corners 317 has six grooves 318, that are V-shaped in cross section, equidistantly arrayed on the outer surface thereof in the circumferential direction, and extending along the axial direction of the rotor 307A (front to rear direction in FIG. 19). In the three-phase brushless motor of this embodiment, the width of the gap between the outer surface 307a and the inner surface of the drive coil 8 (see FIG. 1) is wide at the grooves 318.

N and S poles are alternately and equidistantly formed on the outer surface 307a of the rotor 307A. The boundary between the adjacent different magnetic poles on the outer surface 307a of the rotor 307 is circumferentially shifted from the boundary between the adjacent segments 316. Specifically, the boundary between the adjacent different magnetic poles is located at the mid-point between the grooves 318. More specifically, the boundary between the adjacent different magnetic poles is positioned so that the position of each groove 318 is circumferentially spaced 60° in electrical angle from the boundary between the adjacent N and S poles.

Figure 20:
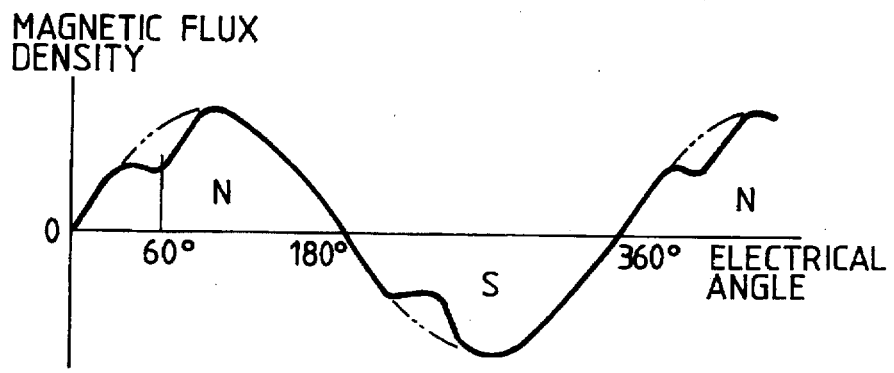
FIG. 20 is a graph showing a variation of a magnetic flux density distribution in the outer surface of the rotor shown in FIG. 19.
Figure 21:
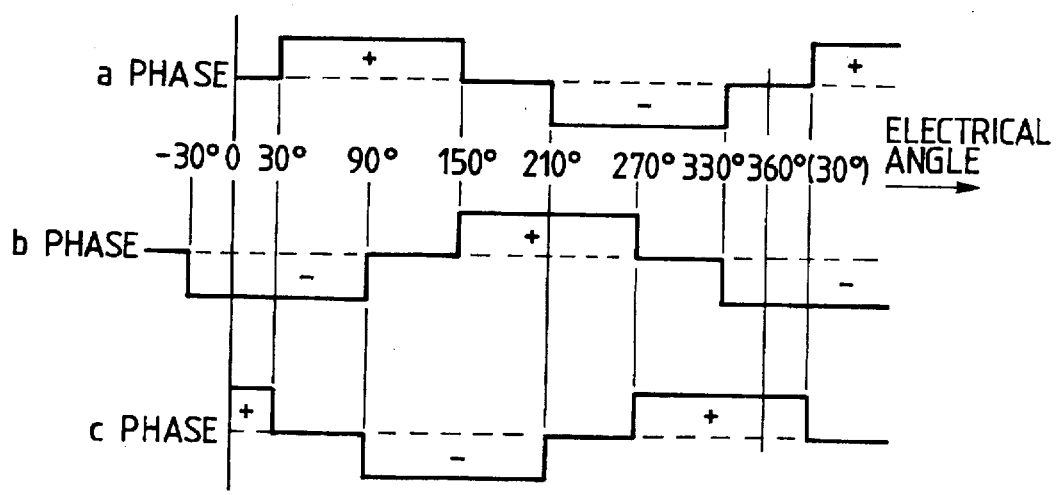
FIG. 21 is a graph showing a state of feeding currents to the drive coils.
Figure 22:
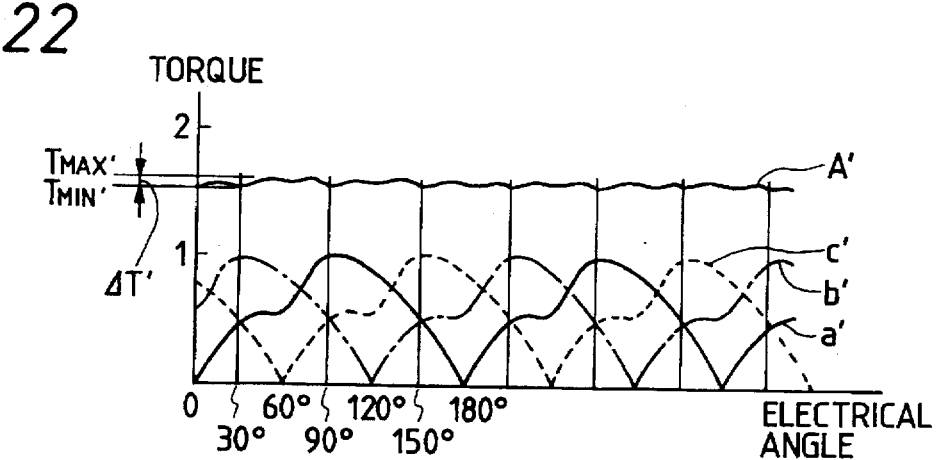
FIG. 22 is a graph showing variations of the torques developed by the three-phase brushless motor of the fourth embodiment.

In the three-phase brushless motor thus constructed, a magnetic flux density is distributed as shown in FIG. 20, in the gap between the outer surface 307a of the rotor 307A and the inner surface of the drive coil 8. As seen, the flux density drops at the position spaced 60° in electrical angle apart from the boundary between the adjacent different magnetic poles. A low flux density region is formed at this position. The drive coil 8 (see FIG. 1), disposed facing the outer surface 307a of the rotor 307A, includes coil elements 10a, 10b, and 10c of three phases (see FIG. 2). Rectangular wave currents having phases shifted one another as shown in FIG. 21 are fed to those coil elements 10a, 10b, and 10c.

When the currents are fed to the coil elements 10a, 10b, and 10c, the torque T for turning the rotor 307A is proportional to the flux density on the outer surface 307a of the rotor 307A, as in the conventional structure. When the torque acting on the rotor 307A by the coil element 10a of phase a varies as indicated by a solid line a' in FIG. 22, the torque of the rotor 307A caused by the coil element 10b of phase b varies as indicated by a chain line b', and the torque of the rotor 307A caused by the coil element 10c of phase c varies as indicated by a broken line c'. A torque of the rotary shaft 6 transmitted from the rotor 307A is the sum of these torques caused individually by these coil elements 10a, 10b, and 10c. The torque of the rotary shaft 6 varies as indicated by a solid line A' in FIG. 22, with rotation of the rotary shaft 6.

The torque T of the rotary shaft 6 represented by the solid line A' is reduced by a quantity corresponding to the reduced quantity of the flux density on the outer surface 307a of the rotor 307A. The portions where the flux density is reduced and hence the torque of the rotary shaft 6 is reduced, correspond to the portions where the value of torque T is peaked. Accordingly, the difference between the maximum value $T_{MAX}'$ and the minimum value $T_{MIN}'$ of the torque, viz., a variation width $\Delta T'$ of the torque T, is reduced by a quantity corresponding to the reduced quantity of the maximum value $T_{MIN}'$ of the torque T.

When a flux density at the position spaced 60° apart from the boundary between the adjacent different magnetic poles of the rotor having the grooves 318 is 70% of that of the rotor having no grooves, a ratio of $\Delta T'$ $(=T_{MAX}'-T_{MIN}')$ to an average value $T_{AVE}'$ $(=(T_{MAX}'+T_{MIN}')/2)$ of the torque T is reduced to approximately 1%. This was confirmed by calculation by the present inventor. A test, conducted by the inventor using a test product, showed 5% of that ratio. In the test product, a ratio of the depth $T_{18}$ of the groove 318 to the thickness $T_{16}$ of the segment 316 was 17%. A ratio of the width $L_{18}$ of the groove 318 to the circumferential length $L_{16}$ of the segment 316 was 17%.

Figure 23:
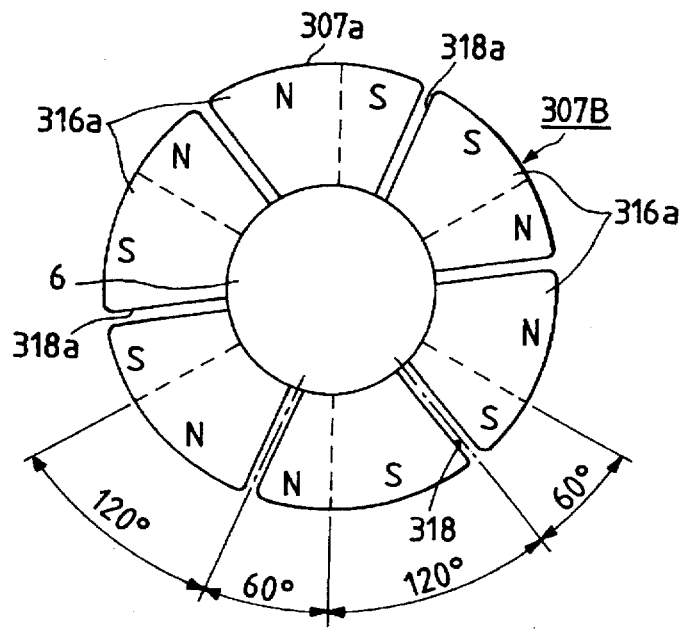
FIG. 23 is a view showing the end face of a rotor assembled into a three-phase brushless motor according to a fifth embodiment of the present invention.

FIG. 23 shows a fifth embodiment of the present invention. In the fifth embodiment, the length of the outer arcuate surface of each of segments or segmental permanent magnets 316a, which form a rotor 307B, is shorter than that in the fourth embodiment. The corners of the outer arcuate surface of each of the segmental permanent magnets 316a are not beveled. The rotor 307B formed by combining the segmental permanent magnets 316a is fastened to the outer surface of the central portion of the rotary shaft 6, as in the fourth embodiment.

The segmental permanent magnets 316a forming the cylindrical rotor 307B are circumferentially arrayed at equal pitches. Accordingly, the resultant rotor 307B has deep grooves 318a each formed between the adjacent segmental permanent magnets 316a. The deep grooves 318a are each located at the position circumferentially spaced 60° (electrical angle) apart from the boundary between the adjacent N and S poles, as in the fourth embodiment. In this embodiment, the construction and operation of the remaining portions are substantially the same as those of the fourth embodiment.

As is apparent from the foregoing description, since the three-phase brushless motor of the fourth or fifth embodiment is thus constructed, a variation of the torque of the rotary shaft is minimized. When the three-phase brushless motor of the embodiment is applied to the drive source of the power steering apparatus, a driver can turn the steering wheel without any unnatural feeling. The deep grooves may easily be formed in the outer surface of the rotor. Accordingly, there is no increase of the cost to manufacture the three-phase brushless motor with the rotor assembled thereinto.

Figure 2:
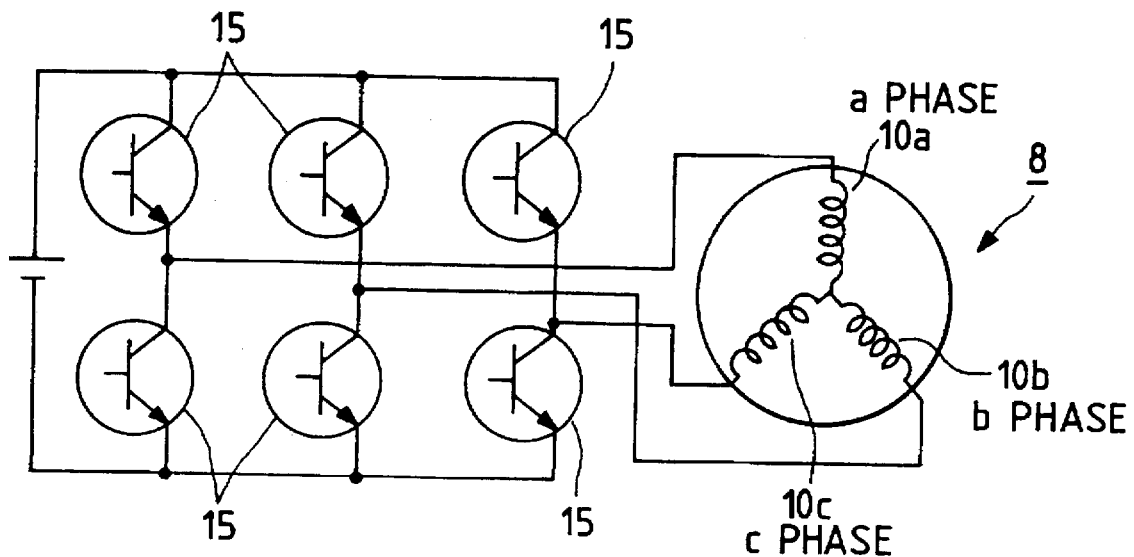
FIG. 2 is a circuit diagram showing a drive circuit for driving drive coils.

All of the three-phase brushless motors according to the first to fifth embodiments have the feature that the torque variation width is small. Because of this feature, those three-phase brushless motors are suitable for the drive source of the power steering device. However, there are some problems to be solved for improving the output power of the motor. To increase the output power of the motor, it is necessary to reduce the internal resistance and the inductance of the drive coil 8, and to feed large currents to the same. To this end, the delta connection rather than the star connection as shown in FIG. 2 is preferable for the connection of the coil elements 10a, 10b, and 10c of the drive coil 8. The delta connection of those coils is employed in a sixth embodiment of the present invention and shown in FIG. 26. In the delta connection, the current flowing to the coil elements 10a, 10b, and 10c are different from those in the star connection. For this reason, the motor having a low flux density region or a magnetic flux absent region formed at a position apart by 60° of electrical angle from the boundary between the adjacent different magnetic poles cannot reduce the torque variation width in a delta connection motor.

Figure 6:
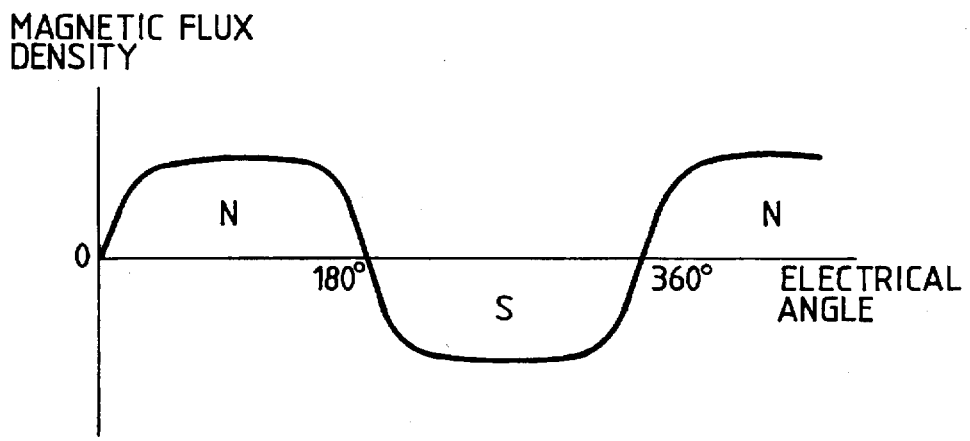
FIG. 6 is a graph showing a variation of a magnetic flux distribution in the outer surface of a rotor which can reduce a torque variation.
Figure 7:
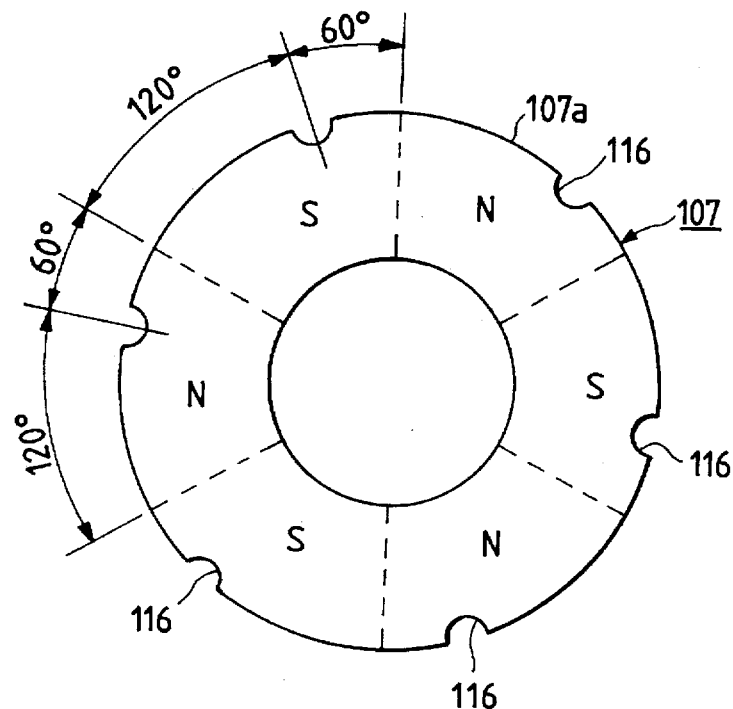
FIG. 7 is a view showing the end face of a rotor assembled into a three-phase brushless motor according to a first embodiment of the present invention.

In the motor based on the star connection, the torque variation may be reduced to a certain degree by varying a flux density on the outer surface of a rotor as indicated by a rectangular wave curve shown in FIG. 6. However, in the motor based on the delta connection, it is impossible to reduce the torque variation even if the flux density is so varied.

According to the sixth embodiment, a three-phase brushless motor can accept the feed of large currents for high output power and reduce the torque variation width.

FIGS. 24 through 28 show the sixth embodiment of the present invention. The sixth embodiment is characterized in that, to reduce a variation of the torque of a three-phase brushless motor with delta-connected drive coils, a rotor 407A is uniquely structured, to thereby adjust a magnetic flux density in the gap between an outer surface 407a of the rotor 407A and the inner surface of the core 9 (see FIG. 1). The construction and operation of the remaining portions are substantially the same as those of the conventional three-phase brushless motor. Thus, the description of the portions similar to those of the conventional three-phase brushless motor will be omitted. The angle used in the drawings is an electrical angle.

Figure 24:
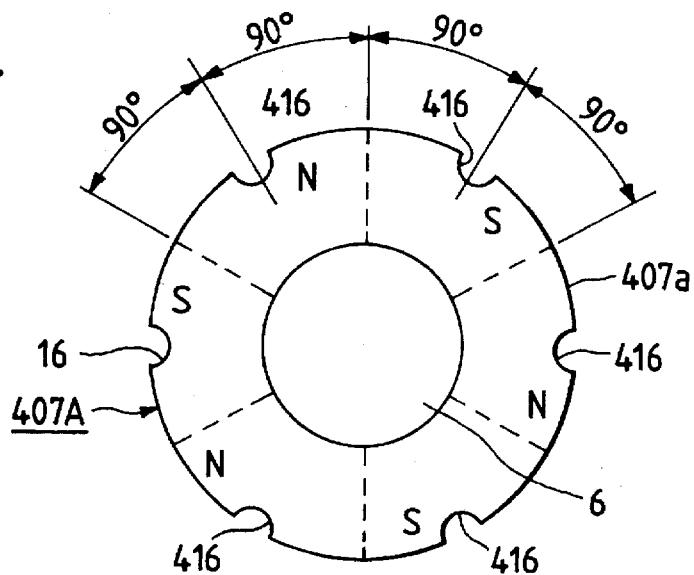
FIG. 24 is a view showing the end face of a rotor assembled into a three-phase brushless motor according to a sixth embodiment of the present invention.

As shown in FIG. 24, N and S poles are alternately and equidistantly arrayed on the outer surface 407a of the rotor 407A. In this embodiment, the outer surface of the rotor 407A is divided into six segments. Three S poles and three N poles are alternately formed in these segments of the outer surface. Grooves 416 are each formed at the mid-point between the adjacent N and S poles, circumferentially spaced 90° of electrical angle apart from the boundary between the adjacent N and S poles. The grooves 416 each extend in the axial direction of the rotor 407A (front to rear direction in FIG. 24).

Figure 25:
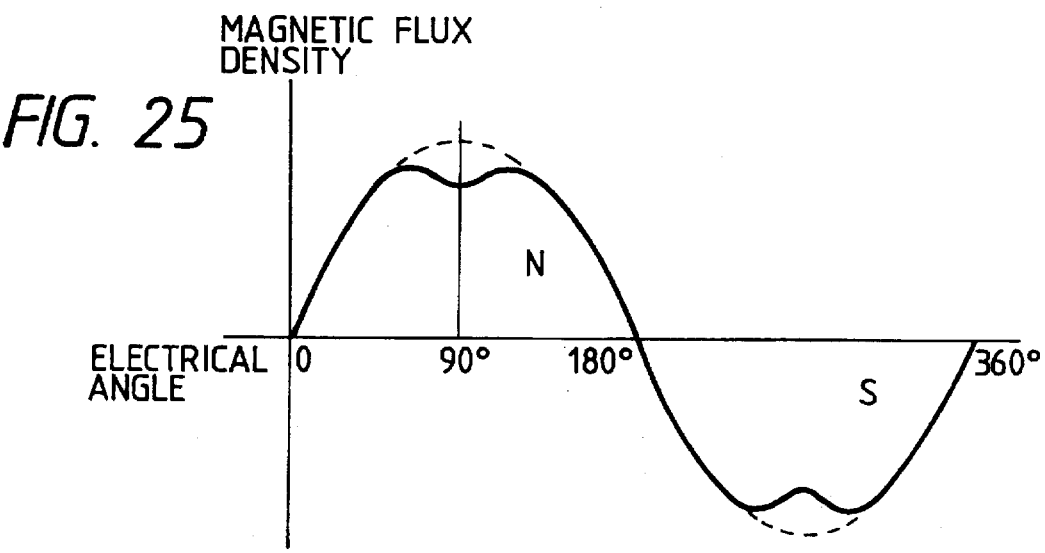
FIG. 25 is a graph showing a variation of a magnetic flux density distribution in the outer surface of the rotor shown in FIG. 24.

In the three-phase brushless motor using the rotor 407A with the grooves, a magnetic flux density is distributed as shown in FIG. 25, in the gap between the outer surface 407a of the rotor 407A and the inner surface of the core 9. As seen, the flux density drops at the position spaced 90° in electrical angle apart from the boundary between the adjacent different magnetic poles. A low flux density region is formed at this position. The drive coil 8 (see FIG. 1), disposed facing the outer surface 407a of the rotor 407A, includes coil elements 10a, 10b, and 10c of three phases (to be described with reference to FIG. 26).

Figure 26:
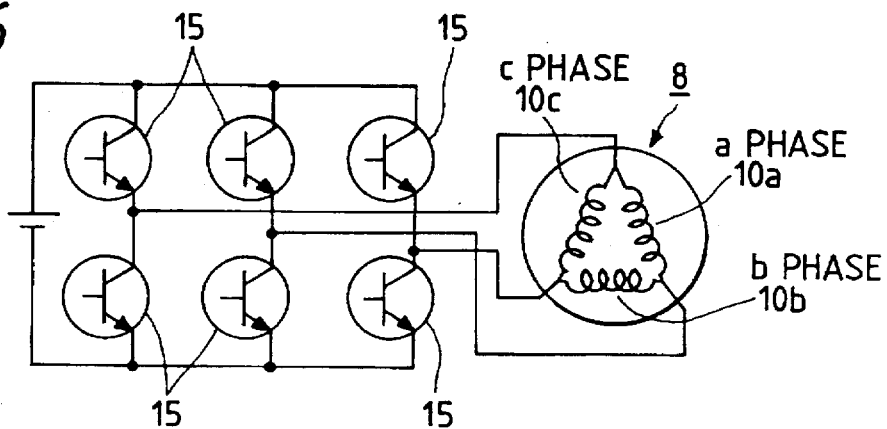
FIG. 26 is a circuit diagram showing a drive circuit for driving the drive coils used in the three-phase brushless motor of the sixth embodiment.
Figure 27:
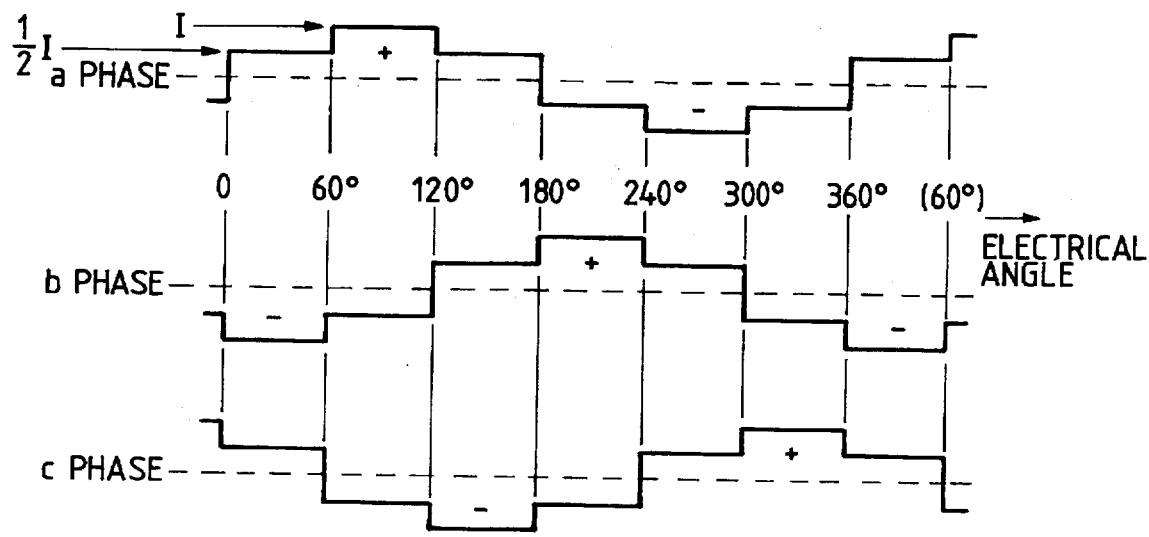
FIG. 27 is a graph showing a state of feeding currents to the drive coils.

In the three-phase brushless motor of the sixth embodiment, unlike the conventional one, the coil elements 10a, 10b, and 10c are delta connected to one another as shown in FIG. 26. As shown, the first ends of the coil elements 10a and 10b are interconnected, the second ends of these coil elements are connected to the first and second ends of the coil element 10c. The rectangular wave currents shifted in phase as shown in FIG. 27 are fed to the delta-connected coil elements 10a, 10b, and 10c when the current feed to these coils is changed by transistors 15 in response to the output signals from the phase sensing elements 12.

It is assumed that an absolute value of the maximum current flowing through the coil elements 10a, 10b, and 10c is denoted as $I$. The current flowing through the coil element 10a of phase a is $+(I/2)$ during the ranges of 0° to 60°, and 120° to 180° in electrical angle. It is $-(I/2)$ in the ranges of 180° to 240°, and 300° to 360°. It is $-I$ in the range of 240° to 300°. The current flowing through the coil element 10b is phase shifted 120° from that flowing through the coil element 10a. The current flowing through the coil element 10c is phase shifted 240° from that flowing through the coil element 10a. A torque that is generated between a specific magnetic pole on the outer surface 407a of the rotor 407A and the coil element 10a (10b or 10c) facing that magnetic pole, and acts to turn the rotor 407A, is expressed by the product of the flux density shown in FIG. 25 and the current value shown in FIG. 27.

Figure 28:
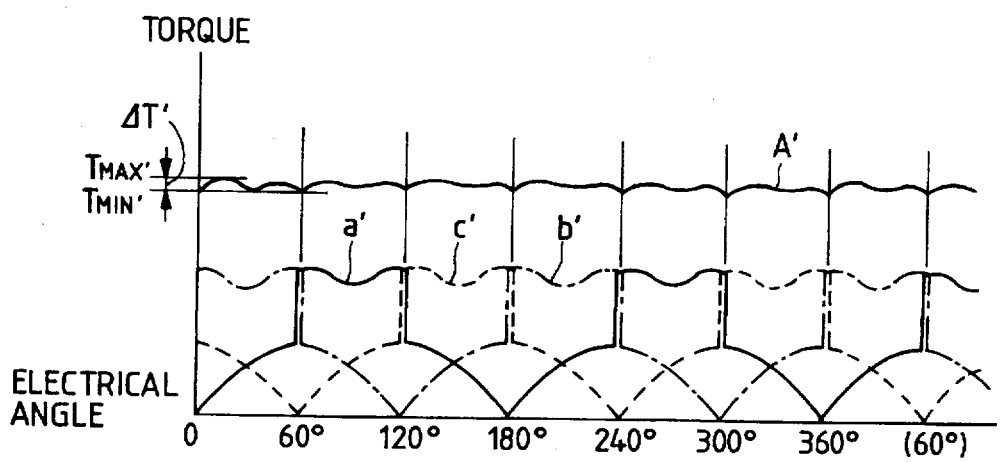
FIG. 28 is a graph showing variations of the torques developed by the three-phase brushless motor of the sixth embodiment.

When the torque acting on the rotor 407A by the coil element 10a of phase a varies as indicated by a solid line a'in FIG. 28, the torque of the rotor 407A caused by the coil element 10b of phase b varies as indicated by a chain line b', and the torque of the rotor 407A caused by the coil element 10c of phase c varies as indicated by a broken line c'. A torque of the rotary shaft 6 transmitted from the rotor 407A is the sum of these torques caused individually by these coil elements 10a, 10b, and 10c. The torque of the rotary shaft 6 varies as indicated by a solid line A' in FIG. 28, with rotation of the rotary shaft 6.

The torque T of the rotary shaft 6 represented by the solid line A' is reduced by a quantity corresponding to the reduced quantity of the flux density on the outer surface 407a of the rotor 407A. The portions where the flux density is reduced and hence the torque of the rotary shaft 6 is reduced, correspond to the portions where the value of torque T is peaked when the grooves 416 are not formed on the outer surface of the rotor. Accordingly, the difference between the maximum value Tmax' and the minimum value Tmin' of the torque, viz., a variation width ΔT' of the torque T, is reduced by a quantity corresponding to the reduced quantity of the maximum value Tmax' of the torque T, which results from provision of the grooves 416.

When a flux density at the position spaced 90° apart from the boundary between the adjacent different magnetic poles of the rotor having the grooves 416 is 80% of that of the rotor having no grooves, a ratio of ΔT' $(=T_{MAX}'-T_{MIN}')$ to an average value $T_{AVE}'$ $(=(T_{MAX}'+T_{MIN}')/2)$ of the torque T is reduced to approximately 5%. This fact was confirmed by the calculation conducted by the inventor.

Figure 29:
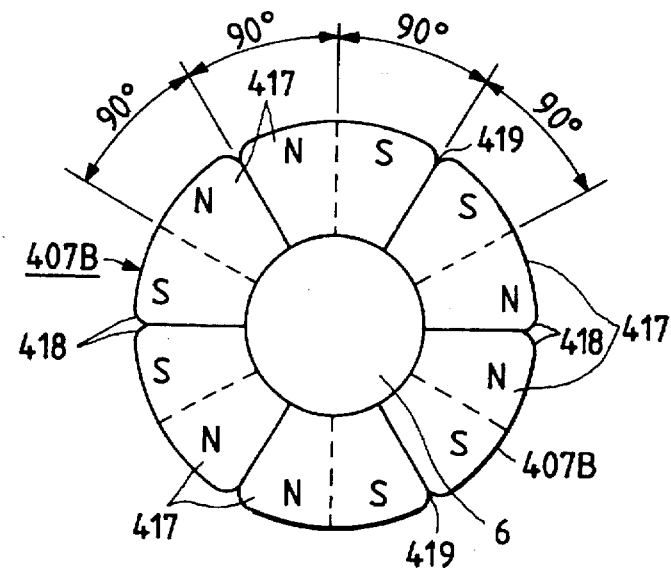
FIG. 29 is a view showing the end face of a rotor assembled into a three-phase brushless motor according to a seventh embodiment of the present invention.

FIG. 29 shows a seventh embodiment of the present invention. In the sixth embodiment, the rotor 407A consists of a single cylindrical permanent magnet. The outer surface of the single permanent magnet is equally divided into six segments. In the seventh embodiment, a plural number of segments or segmental permanent magnets 417 each shaped like a circular arc in cross section are arranged on the same circumference, to thereby form a cylindrical rotor 407B. Specifically, six segmental permanent magnets 417 of the same shape and equal dimensions are combined into the cylindrical rotor 407B. The center angle of each segmental permanent magnet 417 is 60° in mechanical angle.

One half of each of the segmental permanent magnets 417 is an N pole and the other half is an S pole. The adjacent segmental permanent magnets 417 abut on each other at the same polarity. Accordingly, the boundary between the adjacent N and S poles is spaced 90° in electrical angle from the abutting faces of the adjacent segmental permanent magnets 417.

The corners of the outer surface of each of the segmental permanent magnets 417 are beveled. These beveled corners are designated by reference numeral 418. The rotor 407B formed by combining those segmental permanent magnets 417 with the beveled corners 418 has six grooves 419, that are V-shaped in cross section, equidistantly arrayed on the outer surface thereof in the circumferential direction, and extending in the axial direction of the rotor 407B (front to rear direction in FIG. 29). The V-shaped grooves 419 provide low flux density regions. In the gap between the outer surface 407a of the rotor 407B and the inner surface of the core 9 (see FIG. 1), a magnetic flux density is low at the position spaced 90° (electrical angle) apart from the boundary between adjacent N and S poles. As a result, the torque variation width is reduced as in the sixth embodiment.

Figure 30:
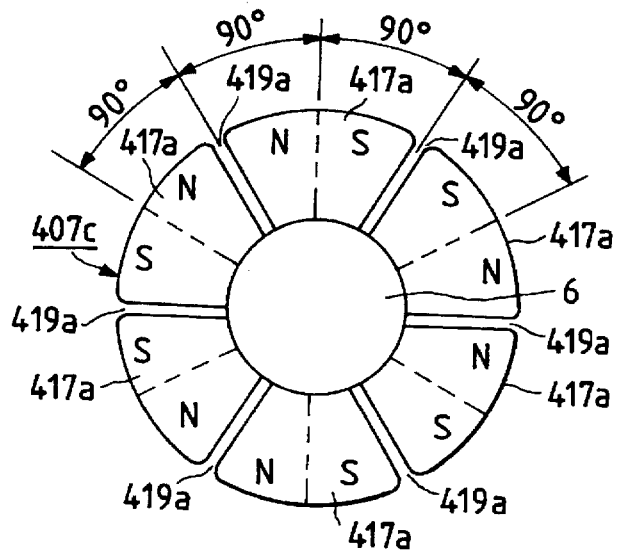
FIG. 30 is a view showing the end face of a rotor assembled into a three-phase brushless motor according to an eighth embodiment of the present invention.

FIG. 30 shows an eighth embodiment of the present invention. In this embodiment, the length of the outer arcuate surface of each of segmental permanent magnets 417a, which form a rotor 407C, is shorter than that in the seventh embodiment. The corners of the outer arcuate surface of each of the segmental permanent magnets 417a are not beveled enough to form a V-shaped groove when those segmental permanent magnets 417a are combined. The rotor 407C formed by combining the segmental permanent magnets 417a is fastened to the outer surface of the central portion of the rotary shaft 6, as in the seventh embodiment.

The segmental permanent magnets 417a forming the cylindrial rotor 407C are circumferentially arrayed at equal pitches. Accordingly, the resultant rotor 407C has deep grooves 419a each formed between the adjacent segmental permanent magnets 417a. These deep grooves 419a provide magnetic flux absent regions. The deep grooves 419a are each located at the position spaced 90° (electrical angle) apart from the boundary between the adjacent N and S poles, as in the seventh embodiment. In this embodiment, it is easy to form the deep grooves 419a on the outer surface of the rotor 407C. This leads to reduction of the cost to manufacture the rotor 407C and a motor using the rotor 407C.

In the gap between the outer surface 407a of the rotor 407C and the inner surface of the core 9 (see FIG. 1), a magnetic flux density is low at the positions corresponding to the magnetic flux absent regions (it is not zero because of leakage flux). As a result, the torque variation width is reduced as in the sixth and seventh embodiments. The remaining construction and operation are substantially the same as those of the seventh embodiment.

Figure 31:
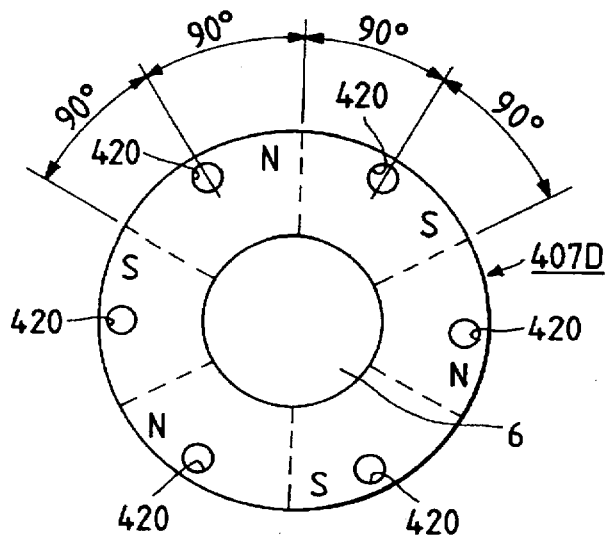
FIG. 31 is a view showing the end face of a rotor assembled into a three-phase brushless motor according to a ninth embodiment of the present invention.

FIG. 31 shows a ninth embodiment of the present invention. In this embodiment, the rotor 407D consists of a single cylindrical permanent magnet. The outer surface of the single permanent magnet is equally divided into six segments with different magnetic poles. In this embodiment, a through hole 420 is formed in each of the segments of the rotor 407D. The through hole 420 is located at the mid-point of each segment (as viewed in the circumferential direction) and inside the outer surface thereof. The through hole 420 extends in the axial direction of the rotor 407D (front to rear direction in FIG. 31). With provision of the through holes 420, a magnetic flux density is correspondingly reduced at the mid-points. The through holes 420 provide low flux density regions. The remaining construction and operation are substantially the same as those of the sixth embodiment.

Figure 3:
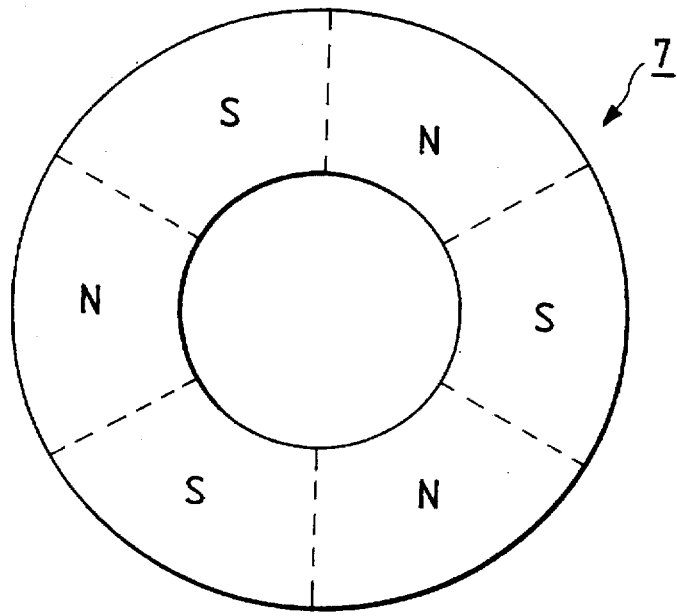
FIG. 3 is a view showing the end face of a rotor assembled into conventional three-phase brushless motor.
Figure 4:
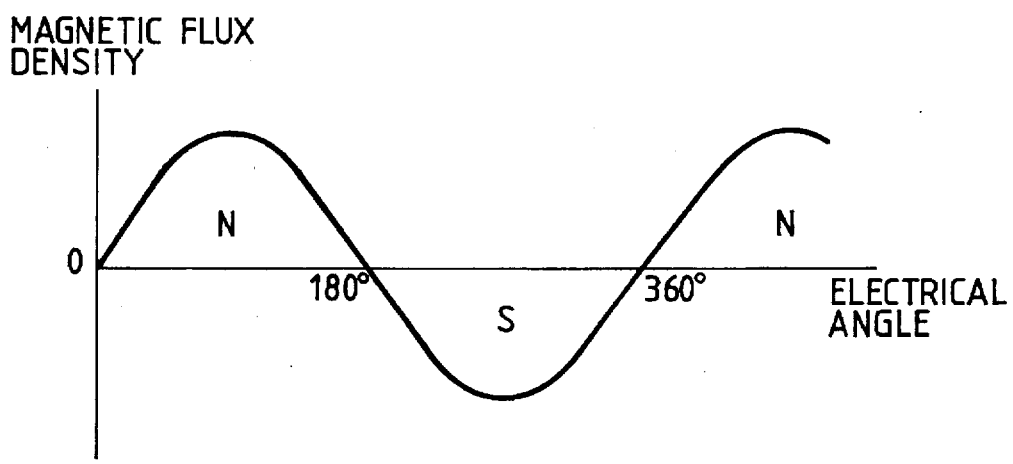
FIG. 4 is a graph showing a variation of a magnetic flux density distribution in the outer surface of the rotor shown in FIG. 3.
Figure 5:
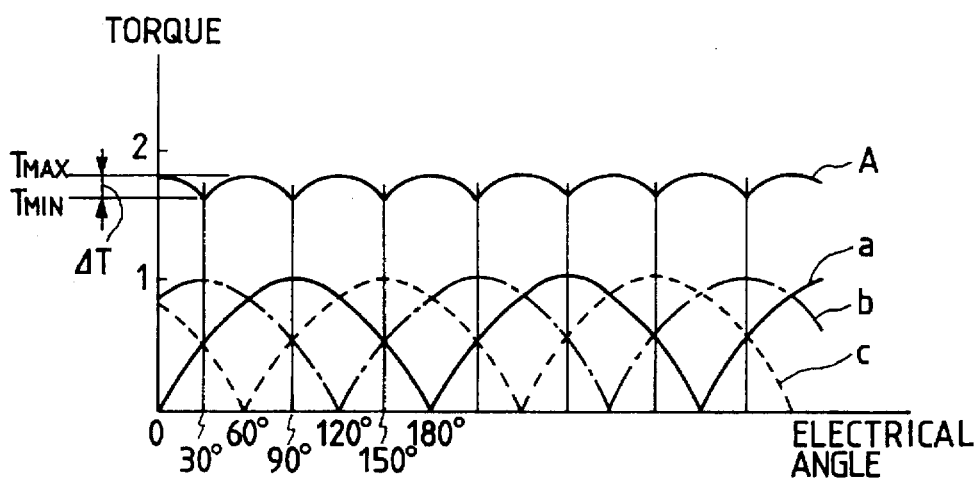
FIG. 5 is a graph showing variations of the torques developed by the conventional three-phase brushless motor.

In the above-mentioned embodiments, the low flux density regions or the magnetic flux absent regions are formed by shaping the permanent magnets of the rotors 407A to 407D. It is evident that the shape of the conventional permanent magnet may be used as it is. The low flux density regions or the magnetic flux absent regions may be formed by properly magnetizing the cylindrical permanent magnet as shown in FIG. 3, for example. The rotor may be covered with a cylindrical cover made of non-magnetic material such as synthetic resin, aluminum, or the like, to prevent the permanent magnet of the rotor from cracking.

As is apparent from the foregoing description, since the three-phase brushless motor of the sixth to ninth embodiments of present invention is thus constructed, a variation of the torque of the rotary shaft is minimized. When the three-phase brushless motor of the embodiments is applied to the drive source of the power steering apparatus, a driver can turn the steering wheel without any unnatural feeling. To increase the output power of the motor, it is possible to reduce the internal resistance and the inductance of the drive coil 8, and to feed large currents to the same. Accordingly, the three-phase brushless motor of the embodiments is small in size but high in output power.

Figure 32:
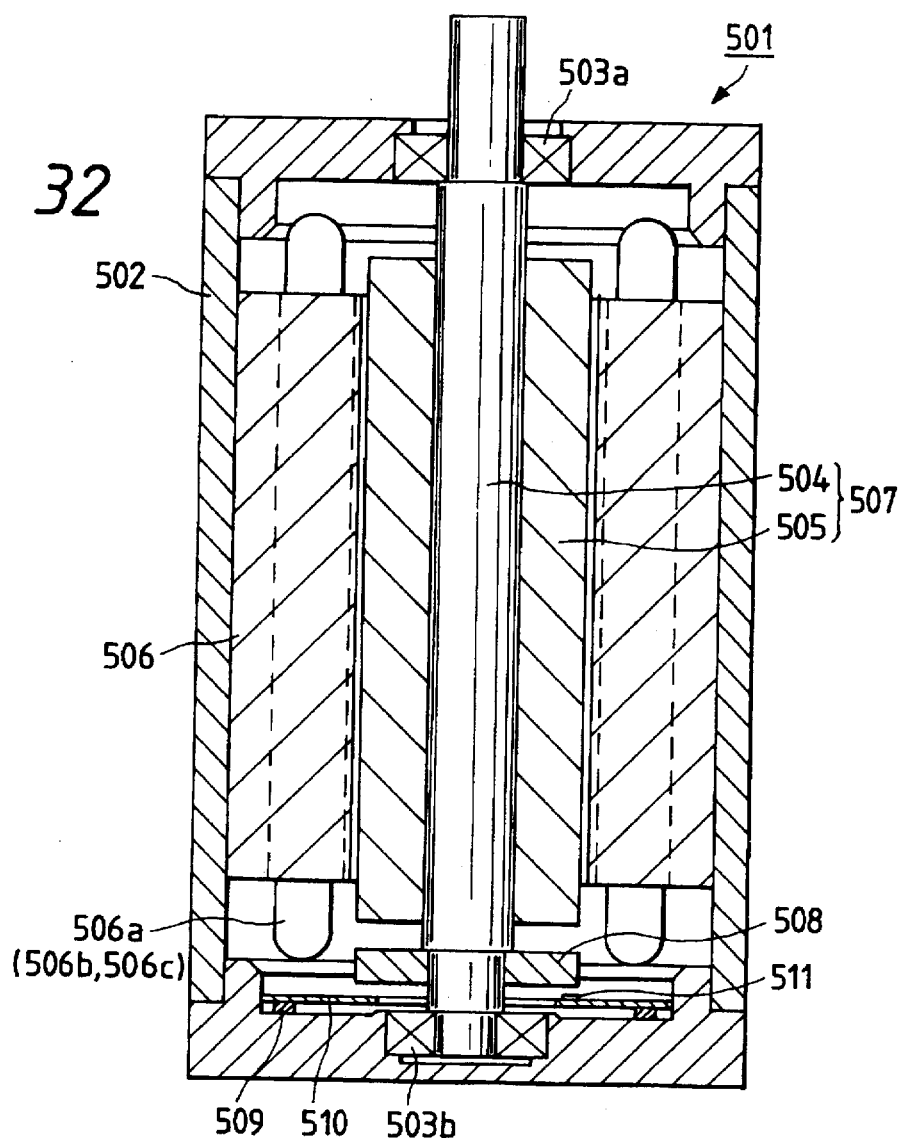
FIG. 32 is a front cross sectional view showing a three-phase brushless motor according to a tenth embodiment of the present invention.

FIG. 32 is a front, cross sectional view showing the construction of a three-phase brushless motor 501 according to a tenth embodiment of the present invention.

The three-phase brushless motor 501 is comprised of a cylindrical housing 502, a rotary shaft 504 disposed along the axis of the cylindrical housing 502 and rotatably supported by bearings 503a and 503b, a permanent magnet (rotor) 505 for motor drive fastened to the rotary shaft 504, and a stator 506 with three-phase exciting coils 506a, 506b, and 506c wound thereon, that is fastened to the inner surface of the cylindrical housing 502 while enclosing the permanent magnet 505. The rotary shaft 504 and the permanent magnet 505 make up a rotatable rotor unit 507.

A position sensing permanent magnet 508, shaped like a ring, is mounted on one end of the rotary shaft 504, in proximity to the rotor unit 507. The permanent magnet 508 is magnetized so that S and N poles alternately and equidistantly are arrayed in the circumferential direction.

A support plate 510 formed of a ring-like thin plate is disposed on the inner surface of the end of the cylindrical housing 502 where the bearing 503b is disposed, in a state that the inner insulating side of the support plate 510 faces the permanent magnet 508. Phase sensing elements 511, such as Hall elements, are fastened to the side of the support plate 510 which is directed to the permanent magnet 508, while facing the permanent magnet 508. Actually, three phase sensing elements 511 are circumferentially arrayed in association with the exciting coils 506a to 506c. In FIG. 32, only one phase sensing element is illustrated since FIG. 32 is a cross sectional view of the brushless motor.

In the three-phase brushless motor thus constructed, the fact that an output signal of the phase sensing element 511 varies depending on the magnetic pole of the permanent magnet 508 when it faces that phase sensing element 511, is used for recognizing a rotating position of the rotor unit 507. A drive circuit to be described later selects the exciting currents fed to the exciting coils 506a, 506b, and 506c in accordance with the sensed rotating position, to thereby turn the rotor unit 507.

Figure 33:
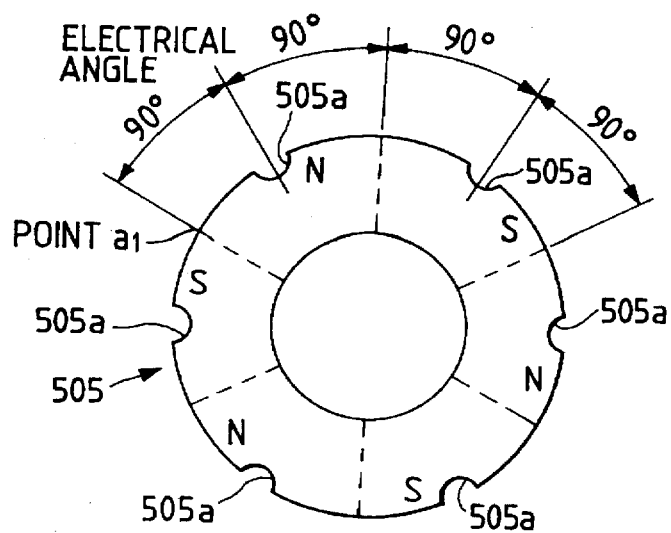
FIG. 33 is a plan view showing a permanent magnet used in the tenth embodiment.

N and S poles are alternately and equidistantly arrayed in the permanent magnet 505 which partially constitutes the rotor unit 507, as shown in a plan view of FIG. 33 showing a state of magnetization of the permanent magnet 505. The total number of the N poles is three, and that of the S poles is also three.

In this embodiment, grooves 505a, axially extended and semicircular in cross section, are formed at the circumferential center positions of the N and S poles of the permanent magnet 505, respectively. These circumferential center positions of the magnetic poles serve as low flux density regions. More specifically, a magnetic flux density at a position distanced 90° of electrical angle from a point al as the boundary between the S and N poles is lower than that at the remaining portion of the permanent magnet 505 not having the grooves. A variation of a magnetic flux density distribution of the permanent magnet 505 with the grooves 505a within the range of 0° to 360° of electrical angle is plotted as a curve indicated by a solid line in FIG. 34. As shown, the curve is incurved at angular positions of 90° and 270° (electrical angle), while a curve of a flux density distribution of the conventional permanent magnet not having the grooves 505a is outwardly curved at these positions (as indicated by dotted lines) to form a sinusoidal curve.

Figure 35:
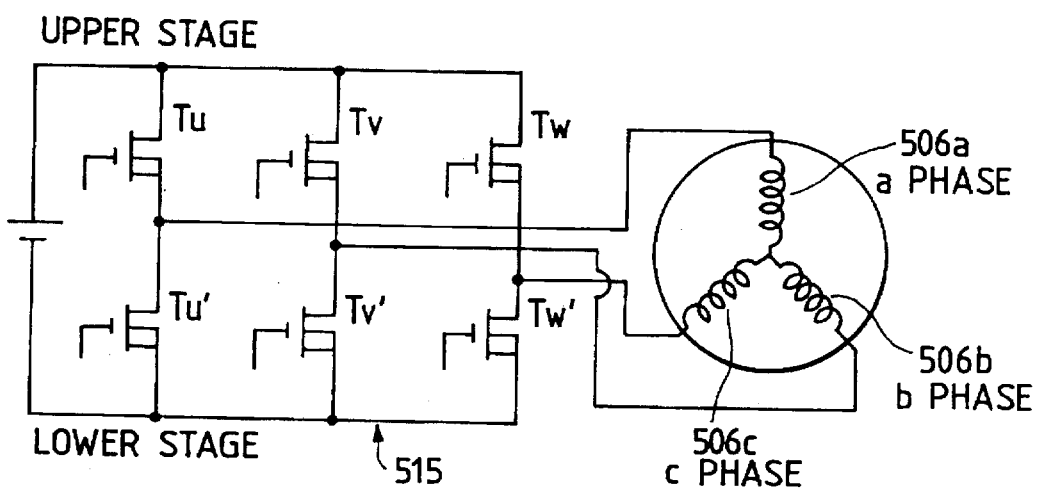
FIG. 35 is a circuit diagram showing a connection of the exciting coils and a drive circuit used in the tenth embodiment.

Three-phase exciting coils 506a, 506b, and 506c are star-connected in a Y shape as shown in FIG. 35, and disposed around the rotor unit 507 while being spaced 120° from one another. A drive circuit 515 for feeding exciting currents to the exciting coils 506a, 506b, and 506c is constructed using six transistors (field effect transistors) Tu, Tv, Tw, Tu', Tv', and Tw', as shown in FIG. 35.

To be more specific, series connections of the paired transistors Tu and Tu', Tv and Tv', and Tw and Tw' are each connected across a power source. The nodes of the paired transistors Tu and Tu', Tv and Tv', and Tw and Tw' are electrically connected to the outer ends of the exciting coils 506a, 506b, and 506c, which are opposite to the center of the star connection thereof.

The gate voltages of the transistors Tu to Tw' are controlled by the output signals of the phase sensing elements 511.

The drive circuit 515 of this embodiment is a three-phase exciting drive circuit for driving the three-phase brushless motor 1 by constantly feeding exciting currents to all of the exciting coils 506a, 506b, and 506c. The polarities and the amplitudes of the exciting currents to the exciting coils 506a, 506b, and 506c are as shown in FIG. 35. The on and off timings of those transistors Tu to Tw' of the three-phase exciting drive circuit are as tabulated in Table 1 below. In the table, "1" indicates ON, and "0" indicates OFF.

TABLE 1

|  | Upper stage | | | Lower stage | | |
| --- | --- | --- | --- | --- | --- | --- |
|  | Tu | Tv | Tw | Tu' | Tv' | Tw' |
| (1) | 1 | 0 | 1 | 0 | 1 | 0 |
| (2) | 1 | 0 | 0 | 0 | 1 | 1 |

TABLE 1-continued

| | | Upper stage | | | Lower stage | |
|---|---|---|---|---|---|---|
| | Tu | Tv | Tw | Tu' | Tv' | Tw' |
| (3) | 1 | 1 | 0 | 0 | 0 | 1 |
| (4) | 0 | 1 | 0 | 1 | 0 | 1 |
| (5) | 0 | 1 | 1 | 1 | 0 | 0 |
| (6) | 0 | 0 | 1 | 1 | 1 | 0 |

Figure 36:
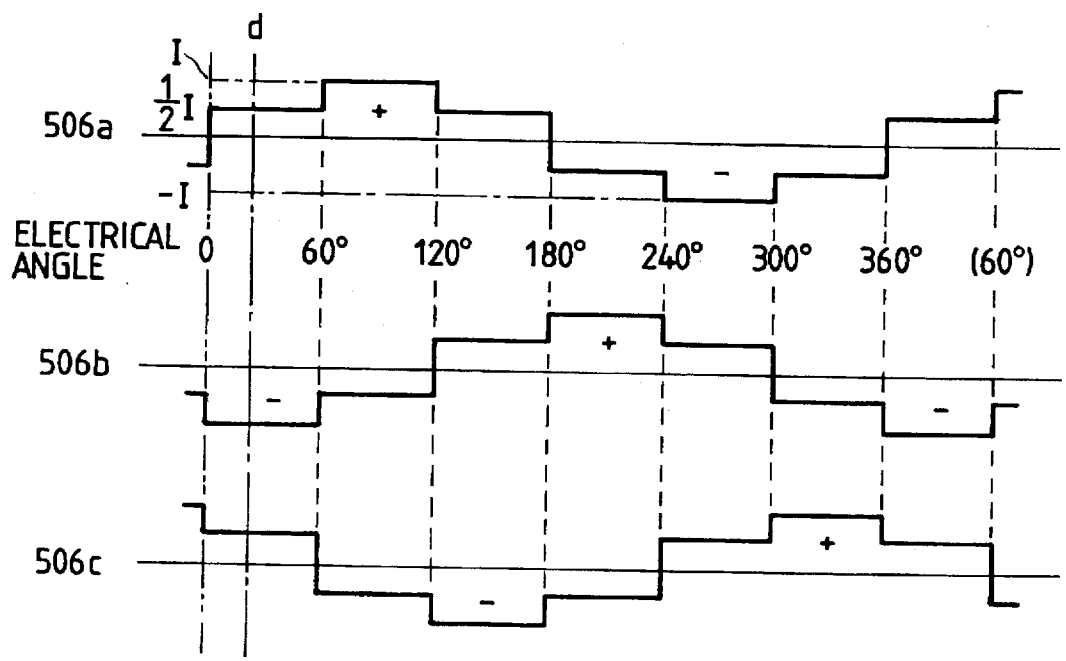
FIG. 36 is a graph showing a set of waveforms of exciting currents fed to the exciting coils in the tenth embodiment.

In a case where the currents flowing through coils are at a position d in FIG. 36, this state corresponds to a phase (1) in Table 1. In this phase, the transistors Tu and Tw in the upper stage of the transistor group and the transistors Tv' in the lower stage are in an on state, while the remaining transistors are in an off state. Accordingly, a current of I/2 flows to the exciting coils 506a and 506c from the outer ends thereof, while a current I flows to the exciting coil 506b from the connection node. Similarly, in the remaining phases (2) to (6), the current I or I/2 flows into the exciting coils 506a, 506b, and 506c in accordance with the on/off state of these transistors.

Thus, in the three-phase exciting drive circuit, even at the time of the phase switching, the current flows from the upper stage to the lower stage through at least two coils, in an uninterruptive manner. In other words, interruption of the current flow never takes place.

Thus, in the three-phase brushless motor based on the three-phase exciting drive system of the tenth embodiment, an instantaneous drop of the torques generated by the exciting coils 506a, 506b, and 506c is eliminated. Therefore, a drop of the minimum value $T_{MIN}$ of the motor torque as the sum of the torques generated by the exciting coils 506a, 506b, and 506c does not occur.

Figure 34:
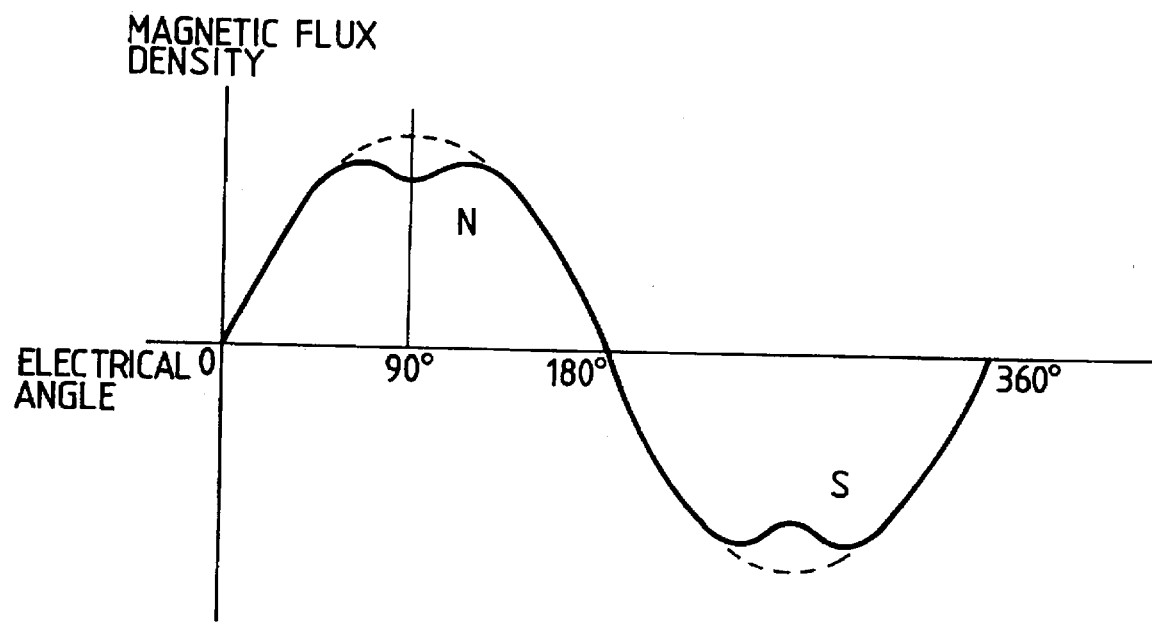
FIG. 34 is a graph showing a distribution of magnetic flux density in the tenth embodiment.

In a three-phase brushless motor designed such that the flux density distribution in the permanent magnet 505 is as shown in FIG. 34, and the amplitudes of the exciting currents flowing to the exciting coils 506a, 506b, and 506c are as shown in FIG. 36, the torques generated by the exciting coils 506a, 506b, and 506c are proportional to the products of the quantities of the magnetic flux orthogonal to the exciting coils 506a, 506b, and 506c and the exciting currents to the exciting coils 506a, 506b, and 506c, respectively. Accordingly, these torques vary as indicated by solid, one-dot chain, and broken lines in the lower part of FIG. 37.

Consider a variation of the torque generated by the exciting coil 506a. During a range from 0° to 60° in electrical angle, the torque gradually increases since the supplied exciting current is I/2. After 60°, the torque instantaneously doubles since the exciting current becomes I. Then, the torque will increase further. However, the torque generated by the exciting coil 506a temporarily decreases since the flux density distribution decreases before and after the position of 90°. After 90°, the torque gradually increases. Just before 120°, the torque slightly decreases. At 120°, the torque instantaneously decreases to be halved since the exciting current returns to I/2 in value. Then, the torque gradually decreases, and at 180° it becomes zero. After 180°, the exciting current fed to the exciting coil 506a is reversed in the polarity, so that the torque gradually increases again. A variation of the torque by the exciting coil 506a during the range from 180° to 360° is the same as that in the range from 0° to 180°. A variation of the torque by the exciting coil 506b is exactly the same as that of the torque by the exciting coil 506a except that the phase of the torque variation delays 120° behind that by the exciting coil 506a. Similarly, a variation of the torque by the exciting coil 506c is exactly the same as that of the torque by the exciting coil 506a except that the phase of the torque variation delays 240° behind that by the exciting coil 506a.

Figure 37:
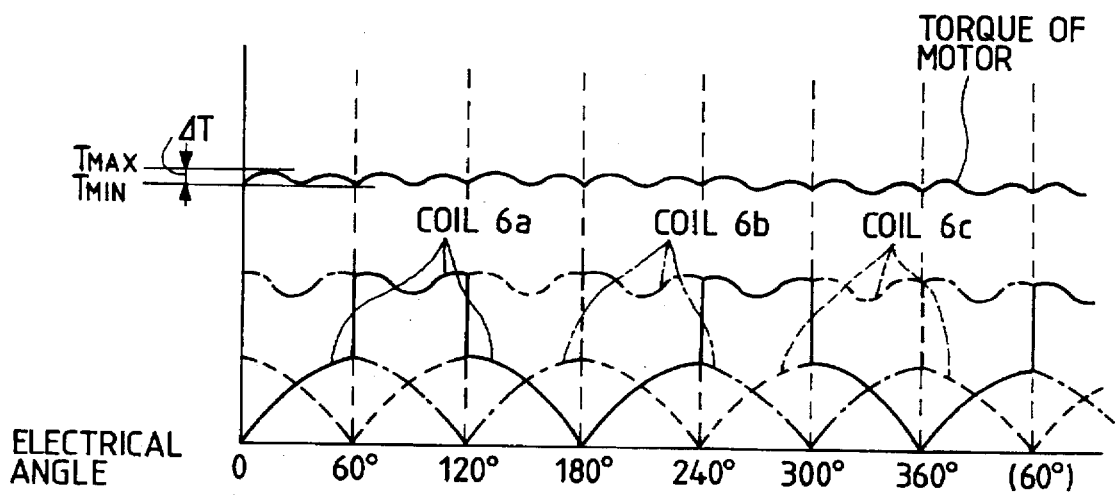
FIG. 37 is a graph showing waveforms of the torques generated by the exciting coils and a torque by the motor in the tenth embodiment.

The torque generated by the three-phase brushless motor 501 varies as indicated by a solid line in the upper part of FIG. 37 since it is the sum of the torques generated by the exciting coils 506a to 506c.

In the normal three-phase brushless motor in which the grooves 505a are not formed in the outer surface thereof, the flux density is maximized at the circumferential central positions of the rotor or the permanent magnet. Therefore, the torques by the exciting coils 506a, 506b, and 506c and hence the torque by the three-phase brushless motor 1 are also maximized at the same positions.

On the other hand, in the three-phase brushless motor of the tenth embodiment, the grooves 505a are formed at the circumferential center position of the permanent magnet 505 where the torque peaks. Because of this, the maximum value $T_{MAX}$ of the motor torque is small.

Thus, the construction of this tenth embodiment prevents the descent of the minimum value $T_{MIN}$ of the motor torque, and reduces the maximum value $T_{MAX}$ of the motor torque. Therefore, the torque ripple defined by the difference of these values $T_{MAX}$ and $T_{MIN}$ is reduced. To confirm the reduction of the torque ripple, a test was conducted. In the test, a three-phase brushless motor 501 in which the flux density at the positions of 90° and 270° (electrical angle) on the permanent magnet 505 is reduced approximately 20%, was constructed, and a torque of the three-phase brushless motor was measured. The result showed that the torque ripple was approximately 5%, about ⅓ as large as in conventional motors. From this test result, it is seen that the three-phase brushless motor of the tenth embodiment is well adaptable for a drive source in a motor-driven power steering apparatus for an automobile, for example.

Figure 38:
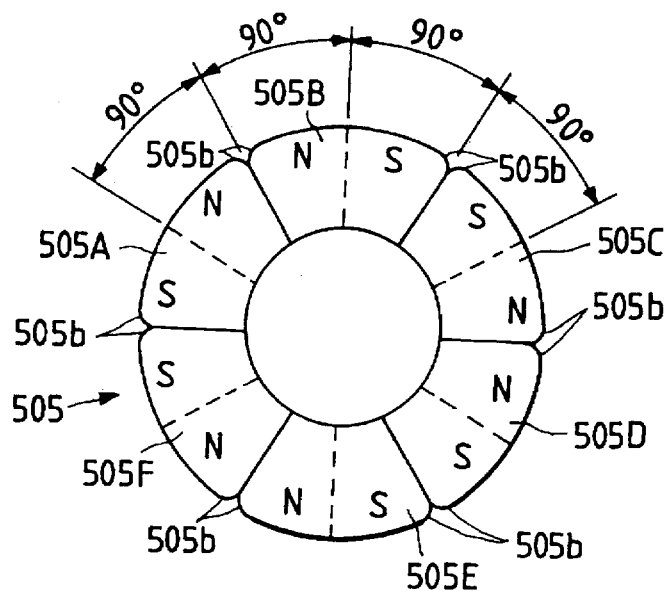
FIG. 38 is a plan view showing a permanent magnet in an eleventh embodiment.

FIG. 38 shows a diagram showing an eleventh embodiment of the present invention. The diagram is a plan view showing a permanent magnet 505 as in FIG. 33 showing the tenth embodiment. The remaining portions of the eleventh embodiment are substantially the same as those of the tenth embodiment, and hence the illustration and explanation of these portions is omitted.

As shown in FIG. 38, a total of six permanent magnets 505A to 505F are arranged around a rotary shaft 504 (see FIG. 32), thereby forming a permanent magnet 505 equivalent to that of the tenth embodiment. Each of the permanent magnets 505A to 505F is shaped like a fan when seen in plan, and consists of an N pole and an S pole. The permanent magnets 505A to 505F abut on each other at the same magnetic polarity.

The fan-shaped permanent magnets 505A to 505F are each beveled at the outer corners. These beveled corners are designated by reference numeral 505b. When those permanent magnets 505A to 505F are arranged as shown in FIG. 38, the adjacent beveled corners 505b are combined into a groove where the flux density is low. The groove is located at a position spaced 90° (electrical angle) from the boundary between the N and S poles.

The eleventh embodiment thus constructed has useful effects comparable with those of the tenth embodiment. The low flux density regions can be formed by cutting out the outer corners of each of the permanent magnets 505A to 505F. Accordingly, the cost of manufacture is less than that of the tenth embodiment requiring a process to form the grooves 505a. The beveled corners may also be formed by using a mold capable of shaping the permanent magnet with the beveled corners, instead of cutting out the corners of the perment magnets 505A to 505F.

Figure 39:
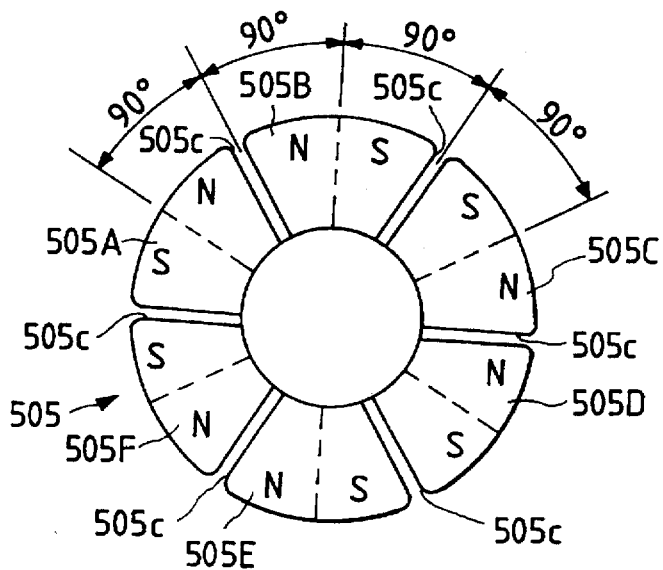
FIG. 39 is a plan view showing a permanent magnet in a twelfth embodiment.

FIG. 39 shows a diagram showing a twelfth embodiment of the present invention. The diagram is a plan view showing a permanent magnet 505 as in FIG. 33 showing the tenth embodiment. The remaining portions of the twelfth embodiment are substantially the same as those of the tenth embodiment, and hence the illustration and explanation of these portion is omitted.

As shown, a total of six permanent magnets 505A to 505F are arranged around the rotary shaft 504 (see FIG. 32), thereby forming a permanent magnet 505 equivalent to that of the tenth embodiment. Each of the permanent magnets 505A to 505F is shaped like a fan when seen in plan, and consists of an N pole and an S pole.

The dimension of each of the permanent magnets 505A to 505F as viewed in the circumferential direction is selected to be slightly smaller than ⅙ as large as that in the eleventh embodiment so that gaps 505c are present between the adjacent permanent magnets. Also in the twelfth embodiment, the adjacent permanent magnets oppose each other at the same magnetic polarity.

When those permanent magnets 505A to 505F are arranged as shown in FIG. 39, the low flux density regions are formed at positions each spaced 90° (electrical angle) from the boundary between the N and S poles. The twelfth embodiment thus constructed has useful effects comparable with those of the first embodiment. Further, there is no need to form the beveled corners. Thus, the cost of manufacture is less than that of the eleventh embodiment.

Figure 40:
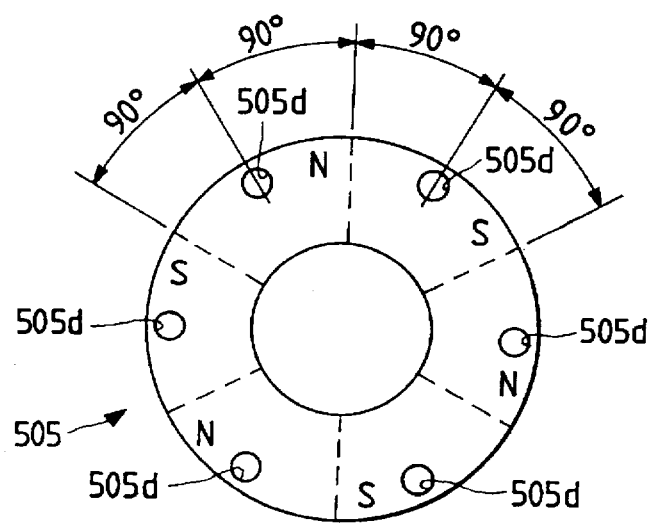
FIG. 40 is a plan view showing a permanent magnet in a thirteenth embodiment.

FIG. 40 shows a diagram showing a thirteenth embodiment of the present invention. The diagram is a plan view showing a permanent magnet 505 as in FIG. 33 showing the tenth embodiment. The remaining portions of the thirteenth embodiment are substantially the same as those of the tenth embodiment, and hence the illustration and explanation of these portions is omitted.

As shown, a circular hole 505d elongated in the axial direction is formed at each of the circumferential center positions of the permanent magnet 505 formed as in the tenth embodiment. With this construction, the low flux density regions are formed at positions each spaced 90° (electrical angle) from the boundary between the N and S poles. The thirteenth embodiment thus constructed also has useful effects comparable with those of the tenth embodiment.

In the above-mentioned embodiments, the permanent magnet 505 is shaped so as to form the low flux density regions at positions each spaced 90° (electrical angle) from the boundary between the N and S poles. The same object may be achieved by properly magnetizing the rotor.

The permanent magnet 505 may be covered with a cylindrical cover in order to protect the permanent magnet 505 against a shock.

As is apparent from the foregoing description, the three-phase brushless motor of the tenth to thirteenth embodiments is constructed such that a three-phase exciting drive circuit is used for the drive circuit, and the low flux density regions are formed at the circumferential center positions of the magnetic poles of the rotor. The three-phase brushless motor thus constructed prevents the descent of the minimum value $T_{MIN}$ of the motor torque, and reduces the maximum value $T_{MAX}$ of the motor torque. Therefore, the torque ripple is reduced.

What is claimed is:

1. A three-phase brushless motor, comprising:

a rotary shaft;

a rotor fixed to an outer surface of said rotary shaft, an outer surface of said rotor being magnetized to have alternately and equidistantly arrayed S and N poles;

a star-connected drive coil of three phases disposed around said rotor;

a plural number of low flux density regions provided in a gap between the outer surface of said rotor and an inner surface of said drive coil, said low flux density regions each being located only at a position circumferentially spaced approximately 60° in electrical angle from a boundary between adjacent N and S poles; and a plural number of high flux density regions provided in the gap between the outer surface of said rotor and the inner surface of said drive coil, said high flux density regions each being located only at a position circumferentially spaced approximately 90° in electrical angle from the boundary between adjacent N and S poles;

wherein when a current of one of said three phases is positioned at said high flux density regions, currents of the other two phases of said three phases are shifted.

2. A three-phase brushless motor as claimed in claim 1, wherein said low flux density regions are defined by a plural number of grooves provided in the outer surface of said rotor.

3. A three-phase brushless motor as claimed in claim 1, wherein said rotor is cylindrical in shape, the outer surface of said rotor is smooth, and said low flux density regions are defined by a plural number of holes axially formed in said rotor, each of said holes being formed only at a position approximately 60° in electrical angle from a boundary between adjacent N and S poles, each of said poles having only one of said holes formed therein.

4. A three-phase brushless motor as claimed in claim 1, wherein said rotor includes a plural number of segments each shaped like a circular arc in cross section and arranged on the same circumference, and wherein a plural number of grooves are formed at a boundary between the adjacent segments, said grooves extending in an axial direction of said rotor and defining said low flux density regions.

5. A three-phase brushless motor, comprising:

a rotary shaft;

a rotor fixed to an outer surface of said rotary shaft, an outer surface of said rotor being magnetized to have alternately and equidistantly arrayed S and N poles;

drive coils of three phases disposed around said rotor, and drive coils being delta connected and opposing said poles;

a low flux density region existing only at a position circumferentially apart 90° in electrical angle from a boundary between the adjacent S and N poles; and a high flux density region existing at a position circumferentially apart approximately 60° in electrical angle from the boundary between the adjacent S and N poles;

wherein when a current of one of said three phases is positioned at said high flux density region, currents of the other two phases of said three phases are shifted.

6. A three-phase brushless motor as claimed in claim 5, wherein said low flux density regions are defined by a plural number of grooves provided in the outer surface of said rotor.

7. A three-phase brushless motor as claimed in claim 5, wherein said rotor is cylindrical in shape, the outer surface of said rotor is smooth, and said low flux density regions are defined by a plural number of holes axially formed in said rotor, each of said holes being formed only at a position approximate 90° in electrical angle from a boundary between adjacent N and S poles, each of said poles having only one of said holes formed therein.

8. A three-phase brushless motor as claimed in claim 5, wherein said rotor includes a plural number of segments each shaped like a circular arc in cross section and arranged on the same circumference, and wherein a plural number of grooves are formed at a boundary between the adjacent segments, said grooves extending in an axial direction of said rotor and defining said low flux density regions.

9. A three-phase brushless motor, comprising:

a rotary shaft;

a rotor fixed to said rotary shaft, said rotor and said rotary shaft being rotatably supported, a circumferential outer surface of said rotor being magnetized to have alternately and equidistantly arrayed N and S poles;

star-connected three-phase exciting coils disposed so as to enclose the outer surface of said rotor;

a drive circuit for supplying exciting currents to said three-phase exciting coils, said drive circuit being a three-phase excite drive circuit for constantly supplying some exciting currents to all of said three-phase exciting coils;

a low magnetic flux density region formed only at a position circumferentially apart about 90° in electrical angle from a boundary between the adjacent S and N poles; and a high flux density region formed at a position circumferentially apart about 60° in electrical angle from the boundary between the adjacent S and N poles;

wherein when a current of one of said three phases is positioned at said high flux density region, currents of the other two phases of said three phases are shifted.

10. A three-phase brushless motor as claimed in claim 9, wherein said low flux density region exists at a position circumferentially apart 90° in electrical angle from a boundary between the adjacent S and N poles.

11. A three-phase brushless motor as claimed in claim 10, wherein said low flux density regions are defined by a plural number of grooves provided in the outer surface of said rotor.

12. A three-phase brushless motor as claimed in claim 10, wherein said rotor is cylindrical in shape, the outer surface of said rotor is smooth, and said low flux density regions are defined by a plural number of holes axially formed in said rotor, each of said holes being formed only at a position approximately 90° in electrical angle from a boundary between adjacent N and S poles, each of said poles having only one of said holes formed therein.

13. A three-phase brushless motor as claimed in claim 10, wherein said rotor includes a plural number of segments each shaped like a circular arc in cross section and arranged on the same circumference, and wherein a plural number of grooves are formed at a boundary between the adjacent segments, said grooves extending in an axial direction of said rotor and defining said low flux density regions.

14. A three-phase brushless motor as claimed in claim 1, wherein said drive coil is a star-connected drive coil.

* * * * *